United States Patent
Yaghmour et al.

(10) Patent No.: US 11,888,569 B2
(45) Date of Patent: Jan. 30, 2024

(54) COMMUNICATION SYSTEM FOR MULTIPLE-INPUT-MULTIPLE-OUTPUT (MIMO) COMMUNICATION WITH AERIAL PLATFORM

(71) Applicant: INTELSAT US LLC, McLean, VA (US)

(72) Inventors: Salim M K Yaghmour, McLean, VA (US); Samson Million, McLean, VA (US)

(73) Assignee: INTELSAT US LLC, McLean, VA (US)

( * ) Notice: Subject to any disclaimer, the term of this patent is extended or adjusted under 35 U.S.C. 154(b) by 93 days.

(21) Appl. No.: 17/454,727

(22) Filed: Nov. 12, 2021

(65) Prior Publication Data
US 2022/0158709 A1    May 19, 2022

Related U.S. Application Data

(60) Provisional application No. 63/113,510, filed on Nov. 13, 2020.

(51) Int. Cl.
*H04B 7/06* (2006.01)
*H04B 7/0413* (2017.01)

(52) U.S. Cl.
CPC ......... *H04B 7/0691* (2013.01); *H04B 7/0413* (2013.01)

(58) Field of Classification Search
CPC .. H04B 7/0413; H04B 7/0608; H04B 7/0691; H04B 7/18504
See application file for complete search history.

(56) References Cited

U.S. PATENT DOCUMENTS

| 7,221,681 B2 | 5/2007 | Choi et al. |
| 7,997,532 B2 | 8/2011 | Tillotson |
| 8,130,693 B2 | 3/2012 | Miller et al. |
| 8,983,455 B1 | 3/2015 | Frolov et al. |
| 9,231,698 B2 | 1/2016 | Erkmen et al. |
| 9,300,388 B1 | 3/2016 | Behroozi et al. |

(Continued)

FOREIGN PATENT DOCUMENTS

| EP | 3 204 985 B1 | 6/2020 |
| KR | 10-1636476 B1 | 7/2016 |
| WO | 2020/104018 A1 | 5/2020 |

OTHER PUBLICATIONS

International Search Report dated Mar. 11, 2022 in International Application No. PCT/US2021/059152.

(Continued)

*Primary Examiner* — David B Lugo
(74) *Attorney, Agent, or Firm* — Sughrue Mion, PLLC

(57) ABSTRACT

A communication system for multiple-in-multiple-out (MIMO) communication with an aerial platform includes a service platform and a controller. The service platform includes plural first antennas in MIMO communication with plural second antennas on the aerial platform, a number of the first antennas being greater than a number of the second antennas. The controller is communicatively coupled to the first antennas, ands select a subset of the first antennas, based on information related to the aerial platform, and communicates plural data streams with the aerial platform via the subset of the first antennas that is selected.

20 Claims, 22 Drawing Sheets

(56) References Cited

U.S. PATENT DOCUMENTS

| | | | |
|---|---|---|---|
| 9,302,782 B2 | 4/2016 | Frolov et al. | |
| 9,329,600 B2 | 5/2016 | DeVaul et al. | |
| 9,484,625 B2 | 11/2016 | Behroozi et al. | |
| 9,519,045 B2 | 12/2016 | Knoblach et al. | |
| 9,584,214 B2 | 2/2017 | Teller et al. | |
| 9,749,984 B2 | 8/2017 | Teller et al. | |
| 9,798,329 B2 | 10/2017 | Shattil | |
| 10,031,711 B2 | 7/2018 | Bryczkowski et al. | |
| 10,187,140 B2 | 1/2019 | Jalali | |
| 10,230,453 B2 | 3/2019 | Behroozi | |
| 10,236,968 B2 | 3/2019 | Alex | |
| 10,305,171 B1* | 5/2019 | Navarro | H01Q 5/307 |
| 10,530,445 B2 | 1/2020 | Alexander et al. | |
| 11,108,455 B2 | 8/2021 | Coldrey et al. | |
| 11,272,376 B2* | 3/2022 | Nilsson | B64C 39/024 |
| 2004/0196813 A1* | 10/2004 | Ofek | H04B 7/0491 370/278 |
| 2010/0295303 A1 | 11/2010 | Lind et al. | |
| 2011/0249760 A1* | 10/2011 | Chrisikos | H01Q 9/14 455/67.11 |
| 2012/0112008 A1 | 5/2012 | Holifield et al. | |
| 2016/0013858 A1 | 1/2016 | Jalali et al. | |
| 2016/0043807 A1 | 2/2016 | Davidson et al. | |
| 2018/0067188 A1 | 3/2018 | Bonawitz et al. | |
| 2018/0083671 A1* | 3/2018 | Alexander | H04B 7/0617 |
| 2018/0098330 A1* | 4/2018 | Nguyen | G06N 7/01 |
| 2018/0262264 A1* | 9/2018 | Alexander | H04B 7/18504 |
| 2019/0140362 A1* | 5/2019 | Edenfield | H01Q 21/24 |
| 2019/0268064 A1* | 8/2019 | Chandra | H04B 17/318 |
| 2019/0341679 A1 | 11/2019 | Ozdemir et al. | |
| 2020/0177268 A1 | 6/2020 | Shahmohammadian et al. | |
| 2020/0328802 A1 | 10/2020 | Buer et al. | |
| 2021/0409107 A1* | 12/2021 | Wiegner | H04B 7/18519 |
| 2022/0078746 A1* | 3/2022 | Lee | H04W 36/08 |

OTHER PUBLICATIONS

Written Opinion of the International Searching Authority dated Mar. 11, 2022 in International Application No. PCT/US2021/059152.

Sheldon et al., "Spatial Multiplexing Over a Line-of-Sight Millimeter-Wave MIMO Link: A Two-Channel Hardware Demonstration at 1.2Gbps Over 41m Range", Proceedings of the 1st European Wireless Technology Conference, Oct. 2008, Amsterdam, The Netherlands, pp. 198-201 (4 pages total).

Kashyap et al., "Equalization Techniques for MIMO Systems in Wireless Communication: A Review", International Journal of Engineering and Advanced Technology (IJEAT), ISSN: 2249-8958, vol. 3, Issue 5, Jun. 2014, pp. 260-264 (5 pages total).

Gannon, "Flat Panel Antennas—State of the Art", Business Com Networks, Nov. 15, 2017 (8 pages total).

* cited by examiner

COMMUNICATION SYSTEM FOR MULTIPLE-INPUT-MULTIPLE-OUTPUT (MIMO) COMMUNICATION WITH AERIAL PLATFORM

CROSS-REFERENCE TO RELATED APPLICATION

This application claims the benefit of priority from U.S. Provisional Application No. 63/113,510 filed on Nov. 13, 2020 in the U.S. Patent and Trademark Office, the entire contents of which is herein incorporated by reference in its entirety.

BACKGROUND

The present disclosure relates to communication systems for multiple-in-multiple-out (MIMO) communication with an aerial platform.

Today, connectivity to rural areas, such as homes and schools, and to mobile platforms, such as cruise ships, cargo ships, airplanes, etc., which have limited or no terrestrial connectivity, is predominately provided by geosynchronous satellites. However, geosynchronous satellites are positioned at fixed location over the earth at 35,785 km above the earth. As such, satellite communication and connectivity provides limited throughput and with a large propagation delay.

Aerial platforms (AP) may operate in the stratosphere at a high altitude, but an altitude lower than a geosynchronous satellite, for example, at approximately 20 km altitude, and typically operate on solar power. Such an aerial platform may be referred to as a high altitude platform station (HAPS) in some contexts. Due to a long lifespan, ease of deployment, and mobility, APs are being explored for deployment in areas with limited or no terrestrial connectivity to replace or augment broadband connectivity. However, APs have several disadvantages. First, APs have limited power available to simultaneously power the AP and provide payload data communication service. This is particularly true at night when lack of solar power results in finite battery power that must be rationed resulting decreasing data throughput particularly at night. Additionally, there is a direct relationship between weight of the AP and power available. Therefore, increasing components on the AP, for example, increasing power storage capability and/or increasing communication components (e.g., antennas, power amplifiers, etc.) to provide increased communication capability results in more weight on the AP and a resulting decrease in power necessary to keep the AP operating at a same nominal altitude.

SUMMARY

According to an aspect of one or more embodiments, there is provided a communication system for multiple-in-multiple-out (MIMO) communication with an aerial platform. The communication system comprises a service platform comprising a plurality of first antennas in MIMO communication with a plurality of second antennas on the aerial platform, a number of the first antennas being greater than a number of the second antennas; and a controller communicatively coupled to the plurality of first antennas and configured to select a subset of the first antennas, based on information related to the aerial platform, and to communicate a plurality of data streams with the aerial platform via the subset of the first antennas that is selected.

According to another aspect of one or more embodiments, there is provided a communication system comprising an aerial platform having a plurality of first antennas; a ground station having a plurality of second antennas in line-of-sight (LoS) multiple-in-multiple-out (MIMO) communication with the plurality of first antennas on the aerial platform; a service platform comprising a plurality of third antennas in LoS MIMO communication with the plurality of first antennas on the aerial platform, a number of the third antennas being greater than a number of the first antennas and a number of the second antennas being greater than the number of the first antennas; a first controller communicatively coupled to the plurality of second antennas and configured to select a subset of the second antennas, based on at least an orientation of the aerial platform relative to the ground station, for a feeder link with the aerial platform, and to communicate a plurality of data streams with the aerial platform via the subset of the second antennas that is selected; and a second controller communicatively coupled to the plurality of third antennas and configured to select a subset of the third antennas, based on at least an orientation of the aerial platform relative to the service platform, for a service link with the aerial platform, and to communicate the plurality of data streams with the aerial platform via the subset of the third antennas that is selected.

According to another aspect of one or more embodiments, there is provided a communication system comprising two or more aerial platforms communicatively connected by laser or RF connection, each of the two or more aerial platforms having a first antenna; a ground station having a plurality of second antennas in line-of-sight (LoS) multiple-in-multiple-out (MIMO) communication with the first antennas; a service platform comprising a plurality of third antennas in LoS MIMO communication with the first antennas on the aerial platform, a number of the third antennas being greater than a number of the first antennas and a number of the second antennas being greater than the number of the first antennas; a first controller communicatively coupled to the plurality of second antennas and configured to select a subset of the second antennas, based on at least orientations of the two or more aerial platforms relative to the ground station, for a feeder link with the two or more aerial platforms, and to communicate a plurality of data streams with the two or more aerial platforms via the subset of the second antennas that is selected; and a second controller communicatively coupled to the plurality of third antennas and configured to select a subset of the third antennas, based on at least orientations of the two or more aerial platforms relative to the service platform, for a service link with the two or more aerial platforms, and to communicate the plurality of data streams with the two or more aerial platforms via the subset of the third antennas that is selected.

BRIEF DESCRIPTION OF THE DRAWINGS

Various embodiments will be described below with reference to the accompanying drawings, in which.

DETAILED DESCRIPTION

Figure 1:
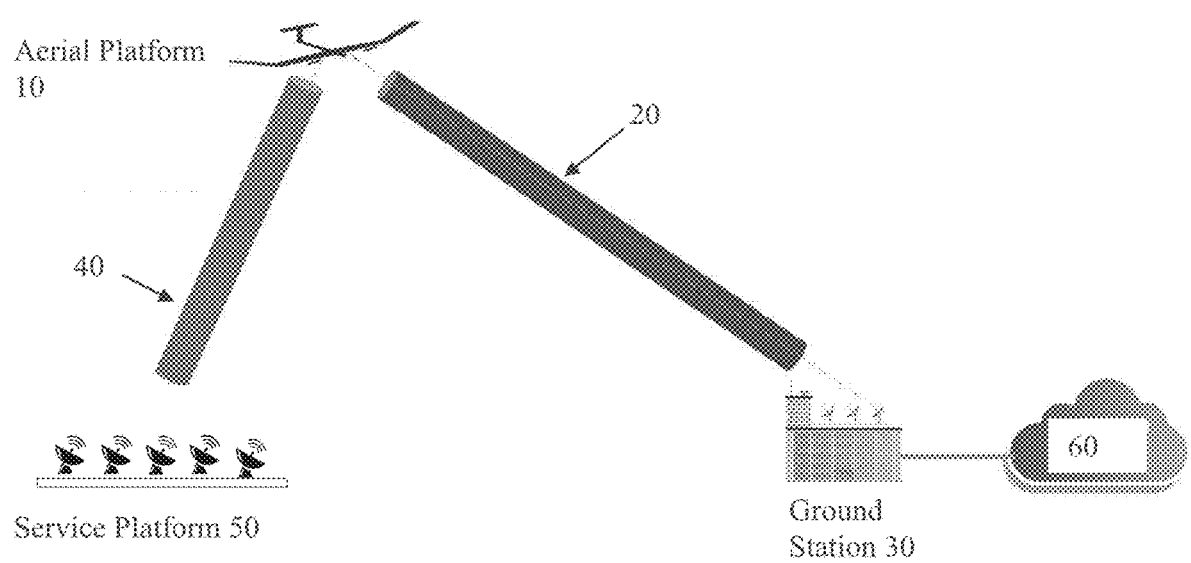
FIG. 1 is a diagram of an overview of an example implementation described herein.

As discussed above, rural areas and mobile platforms in many cases have limited or no terrestrial connectivity. Thus, typically connectivity to such rural areas and mobile platforms has been provided by geosynchronous satellites. Geosynchronous satellites are positioned at a fixed location relative to a position on the earth and at an altitude of 35,785 km above the earth. Therefore, satellite communication and connectivity provides limited throughput with a large propagation delay.

Aerial platforms (AP) are mobile and typically operate on solar power. APs also may operate in the stratosphere at a high altitude such as, for example, 20 km above the earth, but at an altitude significantly lower than that of a geosynchronous satellite. The AP thus may be referred to as a high altitude platform station (HAPS) in some contexts. Due to a long lifespan, ease of deployment, and mobility, APs are being explored for deployment in areas with limited or no terrestrial connectivity to replace or augment broadband connectivity.

However, APs have several disadvantages. First, APs have limited power available to simultaneously power the AP and to power on-board communication payload such as antennas, power amplifiers, and associated payload equipment that provide data communication services. This is particularly true at night when lack of solar power results in finite battery power that must be rationed resulting decreasing data throughput particularly at night. As another disadvantage, there is a direct relationship between weight of the AP and power available. Therefore, increasing components on the AP, for example, increasing power storage capability and/or increasing size, weight, power, etc. of communication components (e.g., antennas, power amplifiers, etc.) to provide increased communication capability results in more weight and real estate on the AP and a resulting decrease in power necessary to keep the AP at a same nominal altitude.

Various embodiments disclosed herein provide communication systems that employ multiple-input-multiple-output (MIMO) technology to provide communication between the AP and a service platform or ground station. The MIMO technology allows for an increased number of antennas but at lower transmit power per antenna, thus maximizing the power per kilogram on the AP.

Because MIMO technology may be sensitive to relative positions of antennas changing within the communication system and because the AP is always moving relative to the antenna(s) in communication with the AP, and thus an orientation of antennas on the AP are constantly changing relative to antennas in communication with the AP, it may be difficult to achieve high data throughput, particularly while also minimizing the power expenditure for the communication payload on the AP.

Various embodiments disclosed herein select a subset of antennas of the communication system to use for communication of data streams, according to various parameters associated with the AP, such as an orientation of the AP relative to a platform in communication with the AP, in order to increase data throughput and/or to minimize the power usage by the AP. Additionally, in some embodiments, the communication system may control antennas of the communication system to physically or electronically move relative to each other in at least one dimension to further maximize the data throughput and/or to minimize the power usage by the AP.

FIG. 1 is a diagram of an overview of an example implementation described herein. In the example implementation illustrated in FIG. 1, a communication system 1 includes an aerial platform (AP) 10, a ground station 30, and a service platform 50. The AP 10 may be in wireless communication with the ground station 30 via a feeder link 20, and the ground station 30 may be in wired or wireless communication with a network 60. In some embodiments, the ground station 30 may be a gateway. The network 60 may be a private network, e.g., a private cloud, and/or may be a public network, e.g., the Internet or a public cloud network. The AP 10 may be in wireless communication with the service platform 50 via a service link 40. The feeder link 20 may provide communication via a first communication protocol, and the service link 40 may provide communication via a second communication protocol, which may be the same as or different from the first communication protocol. The first and second communication protocols are not particularly limited.

The AP 10 may have one or more first antennas 15 on board the AP 10. The ground station 30 may have a plurality of second antennas 35, and the service platform 50 may have a plurality of third antennas 55. In the implementation illustrated in FIG. 1, the ground station 30 is illustrated as having three antennas, and the service platform 50 is illustrated as having five antennas. However, this is only an example, and according to various embodiments, the number of antennas at the ground station 30 may be more or less than three, and the number of antennas at the service platform 50 may be more or less than five.

In operation, the ground station 30 may receive information related to the AP 10, may select a subset of antennas with which to communicate data with the AP 10 based on the received information, and may communicate the data using the selected subset of antennas. The selected subset may include a subset of the plurality of second antennas 35, a subset of the one or more first antennas 15, or a subset of both the second antennas 35 and the first antenna(s) 15. Similarly, the service platform 50 may receive information related to the AP 10, may select a subset of antennas with which to communicate data with the AP 10 based on the received information, and may communicate the data with the AP 10 using the selected subset of antennas. The selected subset may include a subset of the plurality of second antennas 35, a subset of the plurality of third antennas 55, or a subset of both the second antennas 35 and the third antenna 55.

In some implementations, the ground station 30 may control one or more of the subset of antennas to physically or electronically move relative to others of the subset of antennas in order to maximize data throughput of the data between the ground station 30 and the AP 10. For example, in a particular implementation, the ground station 30 may receive the information related to the AP 10, may select a subset of the plurality of second antennas 35 to communicate data with the AP 10 based on the received information, and may control the subset of the second antennas 35 to communicate the data with the AP 10. The ground station 30 may control one or more individual antennas of the subset of second antennas 35 based on the received information to move physically or electronically relative to the remaining ones of the subset of second antennas 35 to maximize data throughput of the data between the ground station 30 and the AP 10. By controlling the one or more individual antennas of the subset of second antennas 35 to move relative to the remaining ones of the subset, the data throughput of data being transmitted and/or received by the second antennas 35 may be maximized.

Similarly, the service platform 50 may control one or more of the subset of antennas to physically or electronically move relative to others of the subset of antennas in order to maximize data throughput of the data between the service platform 50 and the AP 10. For example, in a particular implementation, the service platform 50 may receive information related to the AP 10, may select a subset of the plurality of third antennas 55 to communicate data with the AP 10 based on the received information, and may control the subset of the third antennas 55 to communicate the data with the AP 10. The service platform 50 may control one or more individual antennas of the subset of third antennas 55 to move physically or electronically relative to the remaining ones of the subset of third antennas 55 to maximize data throughput of the data between the service platform 50 and the AP 10. By controlling the one or more individual antennas of the subset of third antennas 55 to move relative to the remaining ones of the subset the data throughput of the data being transmitted or received by the third antennas 55 may be maximized.

Thus, in operation, the communication system 1 according to various embodiments may provide data connectivity between the service platform 50 and the ground station 30 and therefore with the network 60 with low latency similar to latency provided by terrestrial cellular that would otherwise not by available to the service platform 50.

While FIG. 1 illustrates an example implementation with the AP 10 in communication with a single service platform 50, this is only an example, and in some embodiments, a single AP 10 may serve a plurality of service platforms 50 that are within a communication range of the AP 10, as will be described further below.

Figure 2A:
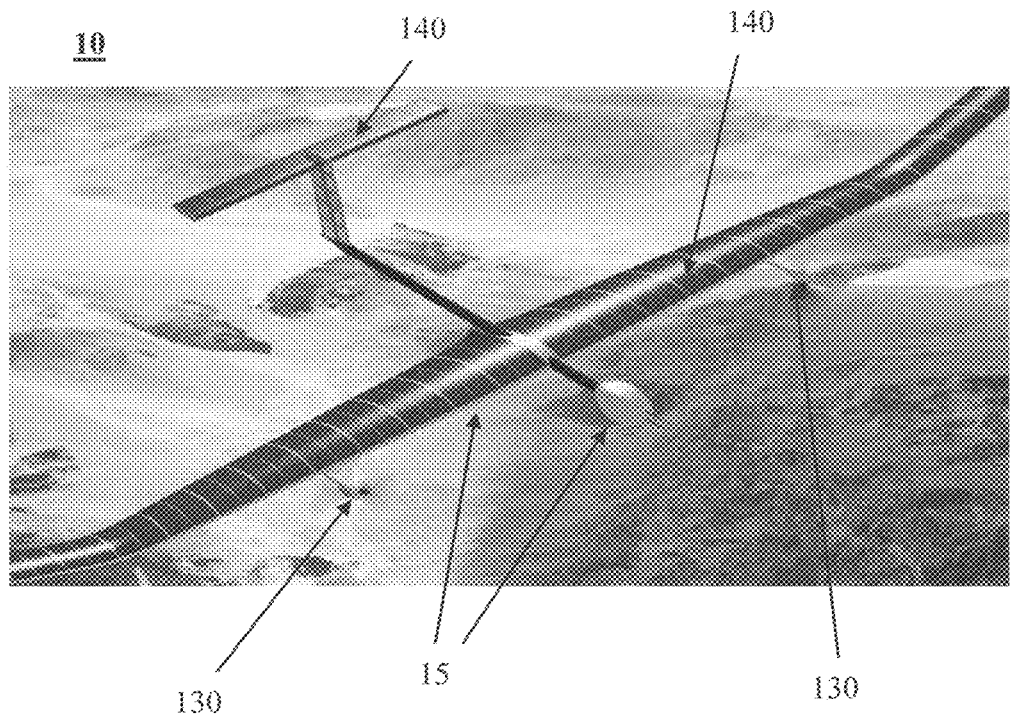
FIGS. 2A and 2B are diagrams of an example of an aerial platform (AP), according to various embodiments.
Figure 2B:
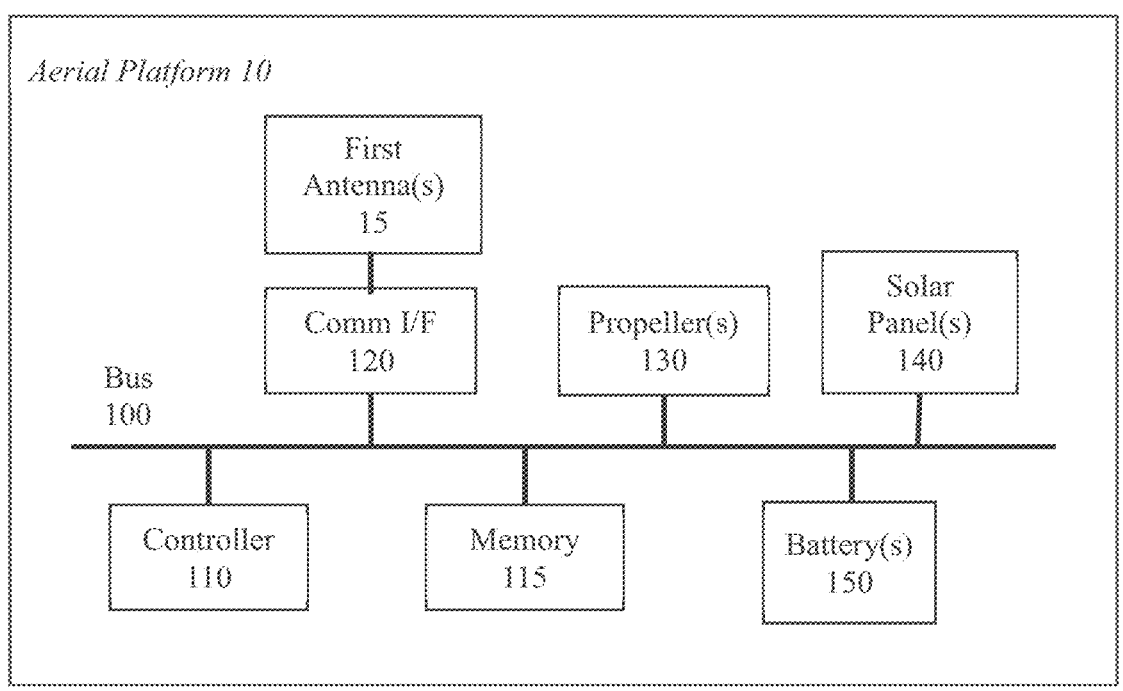

FIGS. 2A and 2B are diagrams of an example of an aerial platform (AP), according to various embodiments. FIG. 2A shows an example of the AP 10 in use, and FIG. 2B shows an example of a configuration of system components of the AP 10.

As illustrated in FIG. 2A, the AP 10 may fly in the stratosphere at approximately 20 km altitude above the earth, and may run on solar power. The AP 10 may be any type of manned or unmanned vehicle including, without limitation, airplanes, airships, or balloons. In some embodiments, the AP 10 may be a fixed-wing platform, as illustrated in FIG. 2A. Examples of the AP 10 may include the Zephyr, Japanese Stratospheric Platform (SPF), Helios, and Project Loon. The AP 10 may cover a large area on Earth.

Referring to FIGS. 2A and 2B, the AP 10 may include a bus 100, a controller 110, a memory 115, a communication interface (Comm I/F) 120, the one or more first antennas 15, one or more propellers 130, one or more solar panels 140, and one or more batteries 150.

The controller 110 may be implemented in hardware, firmware, or a combination of hardware and software. The controller 110 may be a central processing unit (CPU), an accelerated processing unit (APU), a microprocessor, a microcontroller, a digital signal processor (DSP), a field-programmable gate array (FPGA), an application-specific integrated circuit (ASIC), or another type of processing component. In some implementations, the controller 110 may include one or more controllers capable of being programmed to perform a function.

The memory 115 may include a random access memory (RAM), a read only memory (ROM), and/or another type of dynamic or static storage device (e.g., a flash memory, a magnetic memory, and/or an optical memory) that stores information and/or instructions for use by controller 110. The memory 115 stores information and/or software related to the operation and use of AP 10, including flight operations and operations related a communication payload of the AP 10. In some embodiments, the memory 115 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. The memory 115 may store program code which when read and executed by the controller 110, causes the controller 110 to perform the various functions of the AP 10. In some embodiments, the memory 115 may include a cache to store data received from the service platform 50 or the ground station 30, and may store the data during processing for transmission of the data to the service platform 50 or ground station 30.

The communication payload of the AP 10 may include the communication interface (Comm I/F) 120 and the one or more first antennas 15. The communication interface (Comm I/F) 120 may include power amplifiers, matching networks, filters, analog to digital converters, digital to analog converters, oscillators, and/or other components used to interface with the one or more first antennas 15 to provide communication with the service platform 50 and/or the ground station 30 as described in this specification.

The one or more first antennas 15 may include a single dipole antenna, a gimbaled dish antenna, a multi-beam active electronically steerable flat panel antenna (AESA), a passive electronically steerable flat panel antenna (PESA), a sectorized AESA, a sectorized PESA flat panel antenna with three or more sectors per aerial platform, or a metamaterial flat panel antenna, etc. These antennas are only examples, and the type of antenna is not particularly limited.

In some embodiments, the AP 10 may include a single antenna for both the feeder link 20 and the service link 40. In other embodiments, the AP 10 may include two antennas, one of the feeder link 20 and one of the service link 40. However, this is only an example, and in some embodiments, the AP 10 may include a plurality of antennas, including one or more antennas for the feeder link 20 and one or more antennas for the service link 40.

The one or more propellers 130 operate to fly the AP 10 and to maintain the AP 10 at a relatively stable altitude. The one or more propellers 130 are not particularly limited. While the example of the AP 10 illustrated in FIG. 2A has two propellers 130, embodiments are not limited thereto, and in some embodiments the AP 10 may have one propeller or may have more than two propellers.

The one or more solar panels 140 may receive solar energy and convert the solar energy to electrical energy. The one or more solar panels 140 are not particularly limited. In the example illustrated in FIG. 2A, a plurality of solar panels 140 are provided and arranged in sections on the wings of the AP 10. However, this is only an example, and in some embodiments, a single solar panel may be provided.

The one or more batteries 150 may store the electrical energy from the one or more solar panels 140 until the electrical energy is needed to drive the one or more propellers 130 or the communication payload for communication with the service platform 50 and/or the ground station 30.

The controller 110 is communicatively connected via the bus 100 to the memory 115, the communication interface (Comm I/F) 120, the one or more first antennas 15, the one or more propellers 130, the one or more solar panels 140, and the one or more batteries 150, to control the memory 115, the communication interface (Comm I/F) 120, the one or more first antennas 15, the one or more propellers 130, the one or more solar panels 140, and the one or more batteries 150.

The number and arrangement of components shown in FIGS. 2A and 2B are provided as an example. In practice, the AP 10 may include additional components, fewer components, different components, and/or differently arranged components than those shown in FIGS. 2A and 2B. Additionally, or alternatively, a set of components (e.g., one or more components) of the AP 10 may perform one or more functions described as being performed by another set of components of the AP 10.

Figure 3A:
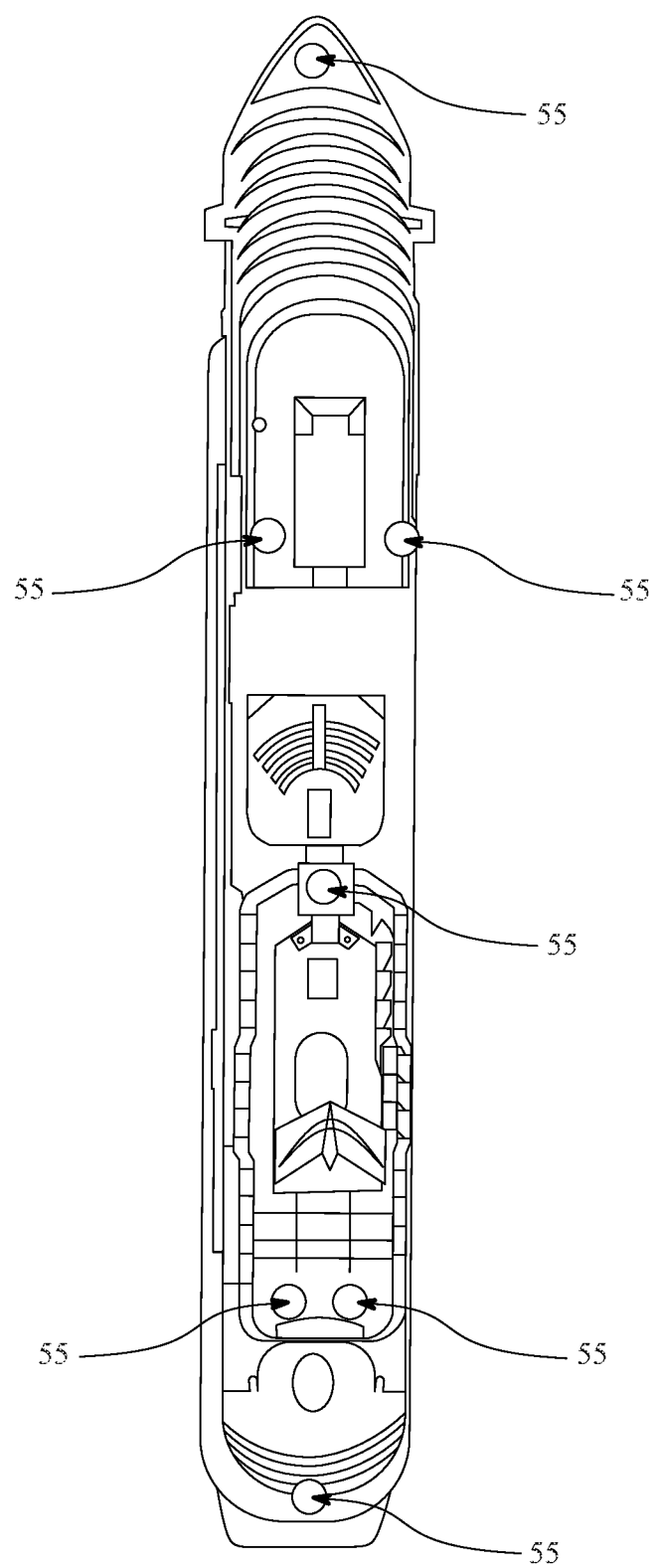
FIGS. 3A and 3B are diagrams of an example of a service platform, according to various embodiments.
Figure 3B:
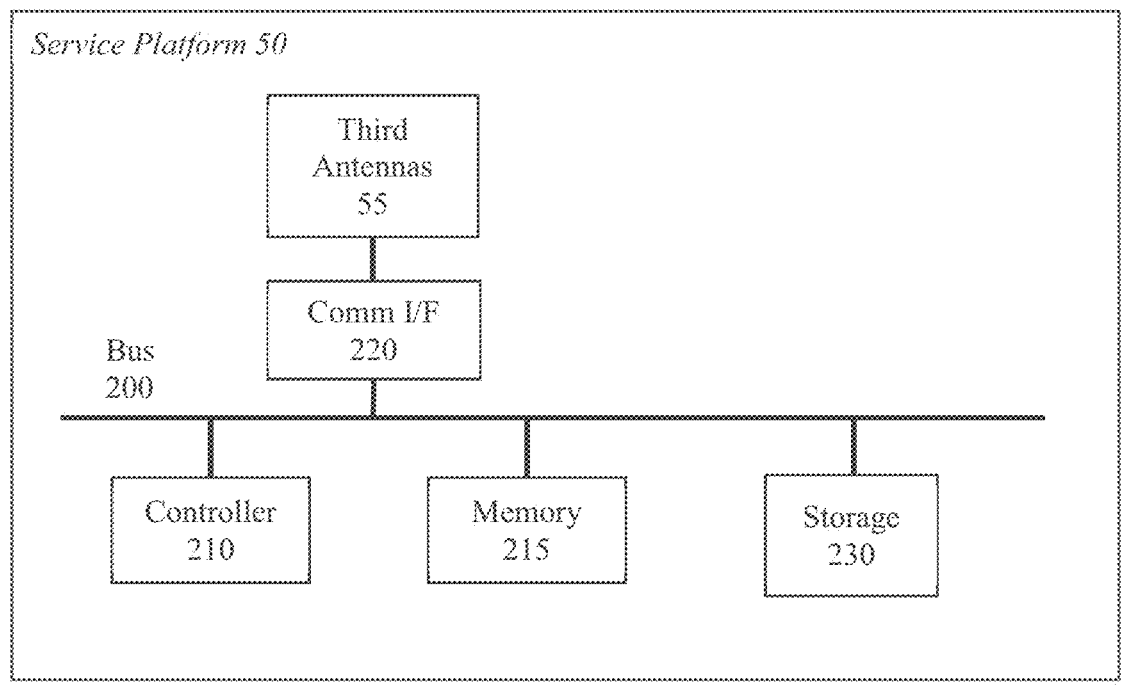

FIGS. 3A and 3B are diagrams of an example of a service platform, according to various embodiments. FIG. 3A shows an example of the service platform 50 in use, and FIG. 3B shows an example of a configuration of system components of the service platform 50.

The service platform 50 may be a mobile platform or a fixed platform. In the case of a mobile platform, examples of the service platform 50 may include a cruise ship, a connected vehicle, an airplane, an Internet of Things (IoT) device or platform, a cargo ship, or a semi-trailer truck, a direct-to-handset smartphone that is changing position rapidly, etc. The service platform 50 may thus be any mobile platform that has a sufficiently large area to provide antenna spacing as discussed further below. In the case of a fixed platform, examples of the service platform 50 may include a school or a home particularly in a rural setting, an Internet of Things (IoT) device/platform/system (e.g., a windmill farm), a radio base station, a 4G/LTE & 5G base station providing Cellular backhaul, a fixed broadband terminal, a direct-to-handset smart phone at relatively fixed position on the ground.

The service platform 50 provides various services to end users on the service platform 50. For example, for a service platform that is a mobile platform, the services may include, without limitation, direct-to-device service to consumer user equipment (UEs) on, for example, a cruise ship (using an end user's existing smartphone), voice calls (e.g., voice over internet protocol (VoIP)), web browsing, video streaming (e.g., SD, HD, HD+), direct-to-IoT terminal service on, for example, a cargo ship, high throughput cellular backhauling (CBH) connectivity to very small aperture terminal (VSAT) on a cruise ship or a connected vehicle, and/or mobile broadband (e.g., Internet access at mobile platforms). For example, for a service platform that is a fixed platform, the services may include, without limitation, Internet of Things (IoT) connectivity, radio base station connectivity, 4G/LTE & 5G base station cellular backhaul, fixed broadband terminals (e.g., at schools and/or homes), direct-to-device service to consumer UEs at a relatively fixed position on the ground (using the end user's existing smartphone), voice calls (VoIP), web browsing, and/or video streaming (e.g., SD, HD, HD+), etc. For the direct-to-device connectivity, the AP 10 may be provided with an eNB for 4G LTE and/or a gNB for 5G capability that is installed on the AP 10.

The service platform 50 is illustrated in FIGS. 1 and 3A as a cruise ship by way of example.

As illustrated in FIG. 3B, the service platform 50 may include, a bus 200, a controller 210, a memory 215, a communication interface (Comm I/F) 220, a storage 230, and the plurality of third antennas 55. The controller 210 is communicatively coupled via the bus 200 to the memory 215, the storage 230, the communication interface (Comm IF) 220, and the plurality of third antennas 55 to control the operations of the memory 215, the storage 230, the communication interface (Comm IF) 220, and the plurality of third antennas 55.

The controller 210 may be implemented in hardware, firmware, or a combination of hardware and software. The controller 210 may be a central processing unit (CPU), an accelerated processing unit (APU), a microprocessor, a microcontroller, a digital signal processor (DSP), a field-programmable gate array (FPGA), an application-specific integrated circuit (ASIC), or another type of processing component. In some implementations, the controller 210 may include one or more controllers capable of being programmed to perform a function.

The memory 215 may include a random access memory (RAM), a read only memory (ROM), and/or another type of dynamic or static storage device (e.g., a flash memory, a magnetic memory, and/or an optical memory) that stores information and/or instructions for use by controller 210. The memory 215 stores information and/or software related to the communications operation of the service platform 50 with the AP 10. In some embodiments, the memory 215 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. The memory 215 may store program code which when read and executed by the controller 210, causes the controller 210 to perform the various functions to provide communication with the AP 10.

The storage 230 stores information and/or software related to the communication operation of the service platform 50 with the AP 10. For example, the storage 230 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. The storage 230 may store program code which when read and executed by the controller 210, causes the controller 210 to perform the various functions for communication with the AP 10.

In some embodiments, the memory 215 and/or the storage 230 may include a cache to store data received from the AP 10 for communication to end user devices present on the service platform 50, and/or may store data received from the end user devices present on the service platform 50 for communication with the AP 10, and through the AP 10 to the ground station 30, and thus to the network 60. In some embodiments, the memory 215 and/or the storage 230 may store the data during processing for transmission of the data to the AP 10 for communication to the network 60 through the ground station 30.

The communication interface (Comm I/F) 220 may include power amplifiers, matching networks, filters, analog to digital converters, digital to analog converters, oscillators, and/or other components used to interface with the plurality of third antennas 55 to provide communication with the AP 10 as described in this specification.

The plurality of third antennas 55 may include a single dipole antenna, a gimbaled dish antenna, a multi-beam active electronically steerable flat panel antenna (AESA), a passive electronically steerable flat panel antenna (PESA), a sectorized AESA, a sectorized PESA flat panel antenna with three or more sectors per aerial platform, or a metamaterial flat panel antenna, etc. These antennas are only examples, and the type of antenna is not particularly limited.

In the example illustrated in FIG. 3A, the plurality of third antennas 55 are spaced apart from one another on the decks of the cruise ship. For example, the plurality of third antennas 55 may be located on a front of the cruise ship, at mid-ship, on a control tower, and at a rear of the cruise ship, so as to be spaced apart from one another. The locations on the cruise ship are not particularly limited as long as the antennas may be spaced apart as discussed further below. The plurality of third antennas 55 are communicatively connected to the controller 210. The controller 210 receives information related to the AP 10 and data and may control the plurality of third antennas 55 to communicate the data with the AP 10, based on the received information.

The number and arrangement of components shown in FIGS. 3A and 3B are provided as an example. In practice, the service platform 50 may include additional components, fewer components, different components, and/or differently arranged components than those shown in FIGS. 3A and 3B. Additionally, or alternatively, a set of components (e.g., one or more components) of the service platform 50 may perform one or more functions described as being performed by another set of components of the service platform 50.

Figure 4:
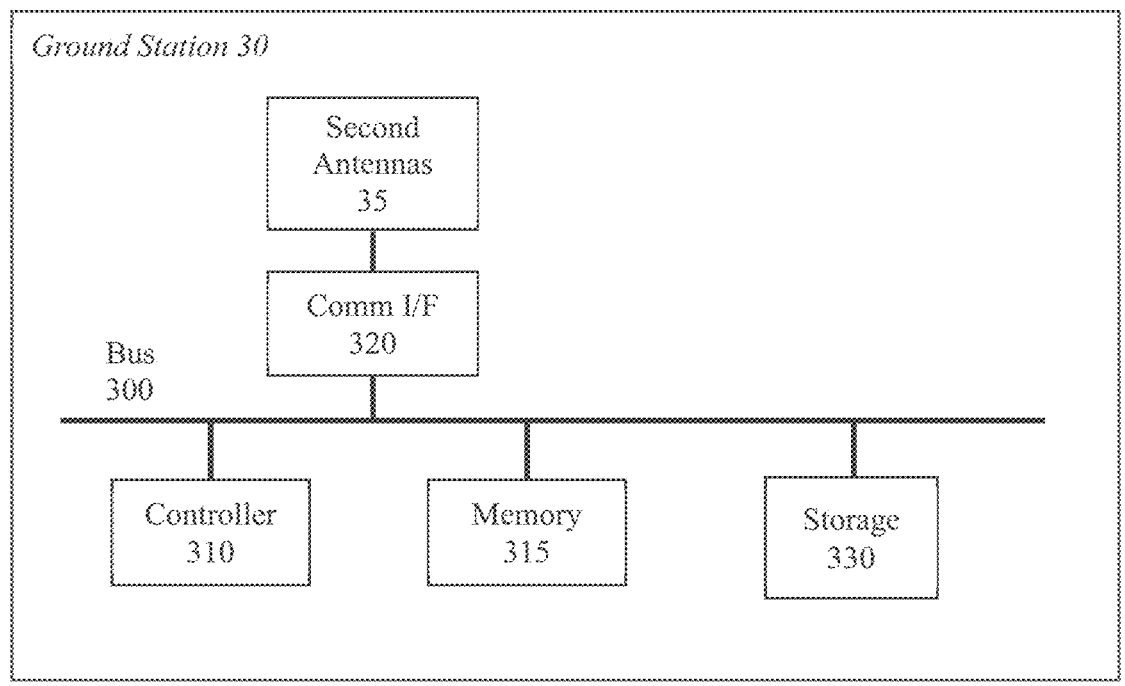
FIG. 4 is a diagram of an example of a ground station, according to various embodiments.

FIG. 4 shows an example of a configuration of system components of a ground station, according to various embodiments.

As illustrated in FIG. 4, the ground station 30 may include, a bus 300, a controller 310, a memory 315, a communication interface (Comm I/F) 320, a storage 330, and the plurality of second antennas 35. The controller 310 is communicatively coupled via the bus 200 to the memory 315, the storage 330, the communication interface (Comm I/F) 320, and the plurality of second antennas 35 to control the operations of the memory 315, the storage 330, the communication interface (Comm IF) 320, and the plurality of second antennas 35.

The controller 310 may be implemented in hardware, firmware, or a combination of hardware and software. The controller 310 may be a central processing unit (CPU), an accelerated processing unit (APU), a microprocessor, a microcontroller, a digital signal processor (DSP), a field-programmable gate array (FPGA), an application-specific integrated circuit (ASIC), or another type of processing component. In some implementations, the controller 310 may include one or more controllers capable of being programmed to perform a function.

The memory 315 may include a random access memory (RAM), a read only memory (ROM), and/or another type of dynamic or static storage device (e.g., a flash memory, a magnetic memory, and/or an optical memory) that stores information and/or instructions for use by controller 310. The memory 315 stores information and/or software related to the communications operation of the ground station 30 with the AP 10. In some embodiments, the memory 315 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. The memory 315 may store program code which when read and executed by the controller 310, causes the controller 310 to perform the various functions to provide communication with the AP 10.

The storage 330 stores information and/or software related to the communication operation of the ground station 30 with the AP 10. For example, the storage 330 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. The storage 330 may store program code which when read and executed by the controller 310, causes the controller 310 to perform the various functions for communication with the AP 10.

In some embodiments, the memory 315 and/or the storage 330 may include a cache to store data received from the AP 10 for communication to devices present on the network 60, and/or may store data received from the devices present on the network 60 for communication with the AP 10, and through the AP 10 to the service platform 50, and thus to the end users on the service platform 50. In some embodiments, the memory 315 and/or the storage 330 may store the data during processing for transmission of the data to the AP 10 for communication to service platform 50 and/or may store the data during processing for transmission to the devices on the network 60.

The communication interface (Comm IF) 320 may include power amplifiers, matching networks, filters, analog to digital converters, digital to analog converters, oscillators, and/or other components used to interface with the plurality of second antennas 35 to provide communication with the AP 10 as described in this specification.

The plurality of second antennas 35 may include a single dipole antenna, a gimbaled dish antenna, a multi-beam active electronically steerable flat panel antenna (AESA), a passive electronically steerable flat panel antenna (PESA), a sectorized AESA, a sectorized PESA flat panel antenna with three or more sectors per aerial platform, or a metamaterial flat panel antenna, etc. These antennas are only examples, and the type of antenna is not particularly limited.

The plurality of second antennas 35 are spaced apart from one another at the location of the ground station. The locations at the ground station 30 are not particularly limited as long as the antennas may be spaced apart as discussed further below. The plurality of second antennas 35 are communicatively connected to the controller 310. The controller 310 receives information related to the AP 10 and data and may control the plurality of second antennas 35 to communicate the data with the AP 10, based on the received information, and thus to the service platform 50 through the AP 10.

The number and arrangement of components shown in FIG. 4 are provided as an example. In practice, the ground station 30 may include additional components, fewer components, different components, and/or differently arranged components than those shown in FIG. 4. Additionally, or alternatively, a set of components (e.g., one or more components) of the ground station 30 may perform one or more functions described as being performed by another set of components of the ground station 30.

Figure 5:
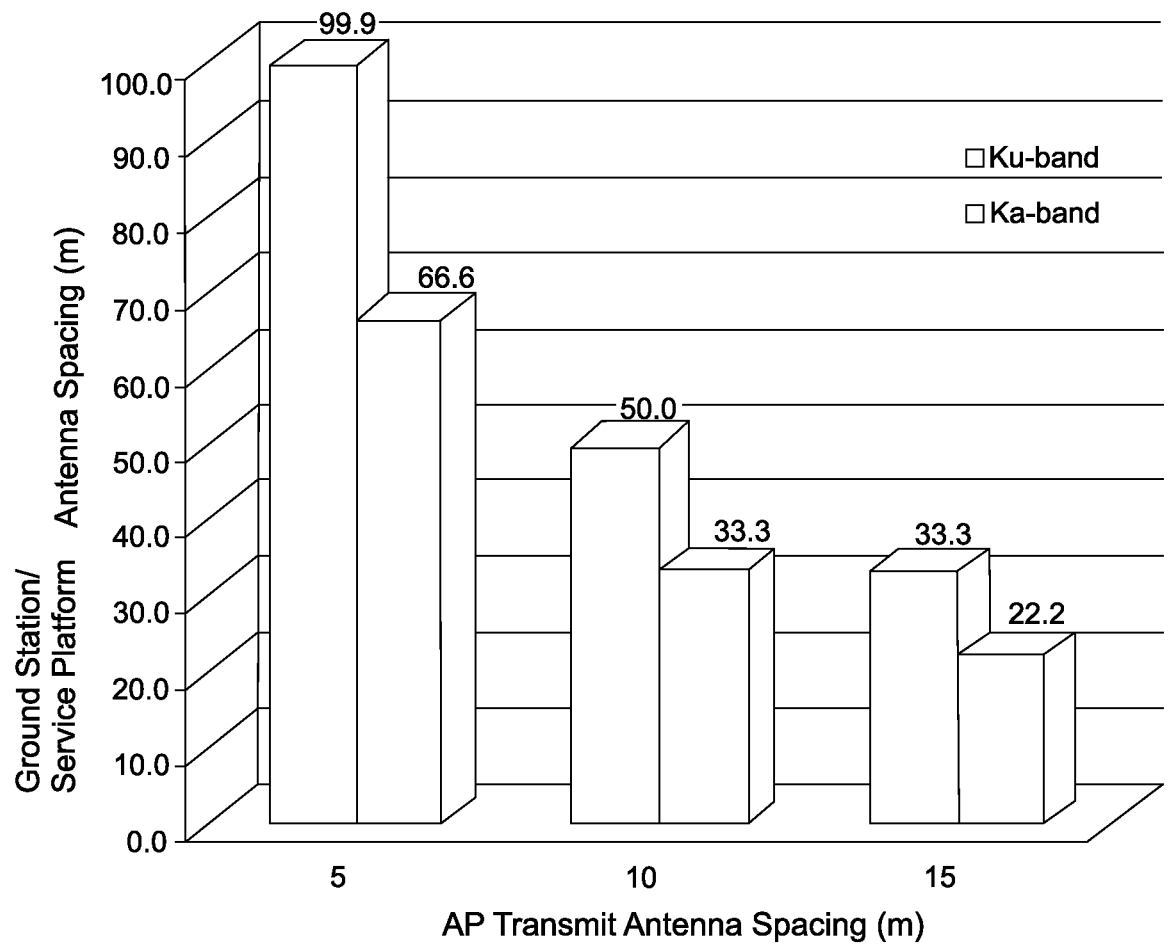
FIG. 5 is a diagram of an example of different antenna spacings, according to various embodiments.
Figure 6:
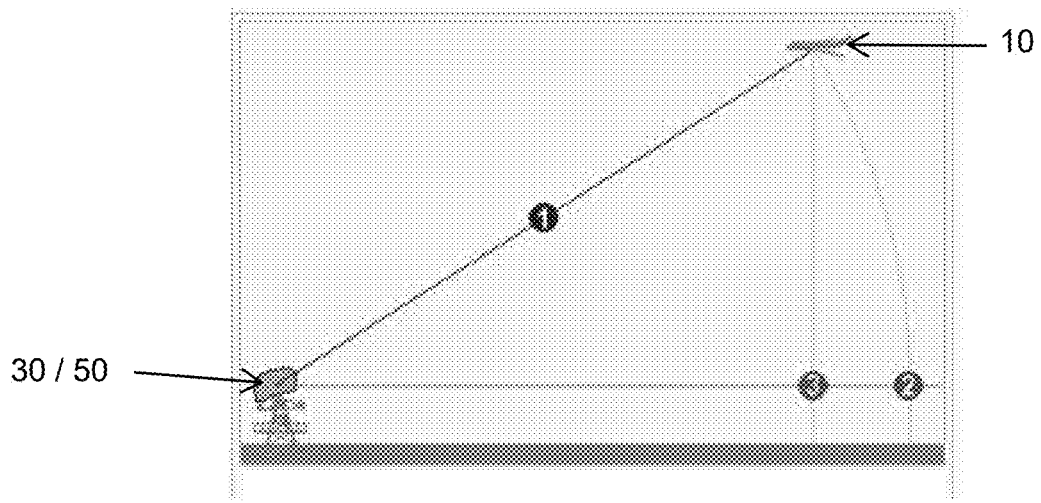
FIG. 6 is a diagram of an example of slant range, according to an embodiment.

FIG. 5 is a diagram of an example of different antenna spacings, according to various embodiments. FIG. 6 is a diagram of an example of slant range, according to an embodiment.

FIG. 5 shows an example of spacings between the first antennas 15 of the AP 10 and third antennas 55 of the service platform 50 or the second antennas 35 of the ground station 30 for Ku-band (12 GHz) and Ka-band (18 GHz) assuming a slant range of 40 km. Here, the term "slant range" refers to the line-of-sight distance along a slant direction between two points which are not at the same altitude relative to a specific datum. The slant range is thus the hypotenuse of the triangle represented by the altitude of the AP 10 and the distance between the antenna on the service platform 55 or the ground station 30 and the ground track of the AP 10 (i.e., the point on the Earth at which it is directly overhead).

As illustrated in FIG. 5, there is a direct relationship between the antenna spacing on the service platform 55 or the ground station 30 and the antenna spacing on the AP 10. For example, assuming an antenna spacing of the first antennas 15 on the AP 10 of 10 m, the antenna spacing of the third antennas 55 on the service platform 50 would be about 55 m for Ku-band or about 40 m for Ka-Band. Similar antenna spacing may be calculated for other frequencies including Q-band (40 GHz) and V-band (50 GHz). Generally, higher frequencies result in smaller spacing between the antennas on the service platform or at the ground station.

Figure 7:
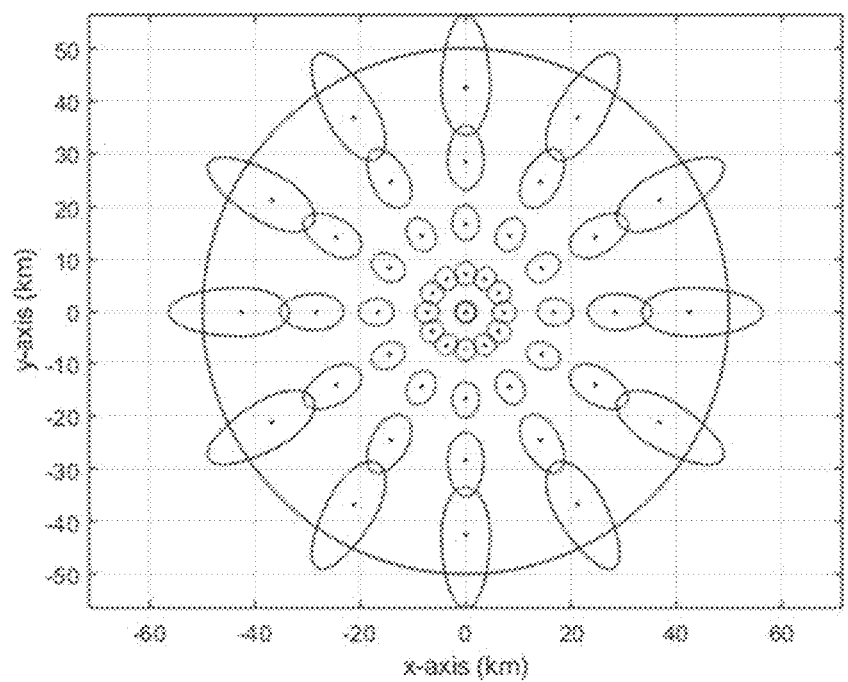
FIG. 7 is a diagram of an example of spot beams of a multi-beam electronically steerable antenna (ESA), according to an embodiment.

FIG. 7 is a diagram of an example of a size of spot beams for a multi-beam active electronically steerable antenna (AESA), according to an embodiment. The multi-beam AESA may correspond to any of the first antenna(s) 15, the second antennas 35, or the third antennas 55 described above. FIG. 5 shows an example of the size of the spot beams inside a 50 km radius at C-band. In operation, in the case of the AP 10, only a portion of the spot beams of the first antenna(s) 15 may be enabled to track the service platform(s) 50 inside the connectivity radius of the AP 10 (see FIGS. 6A and 6B). The maximum number of beams supported depends on the space, weight and power (SWaP) available on the AP 10.

For the service link with multi-beam active electronically steerable antenna (AESA) or the passive electronically steerable antenna (PESA) flat panel antennas, the AP 10 may service multiple service platforms 50 at the same time.

Figure 8A:
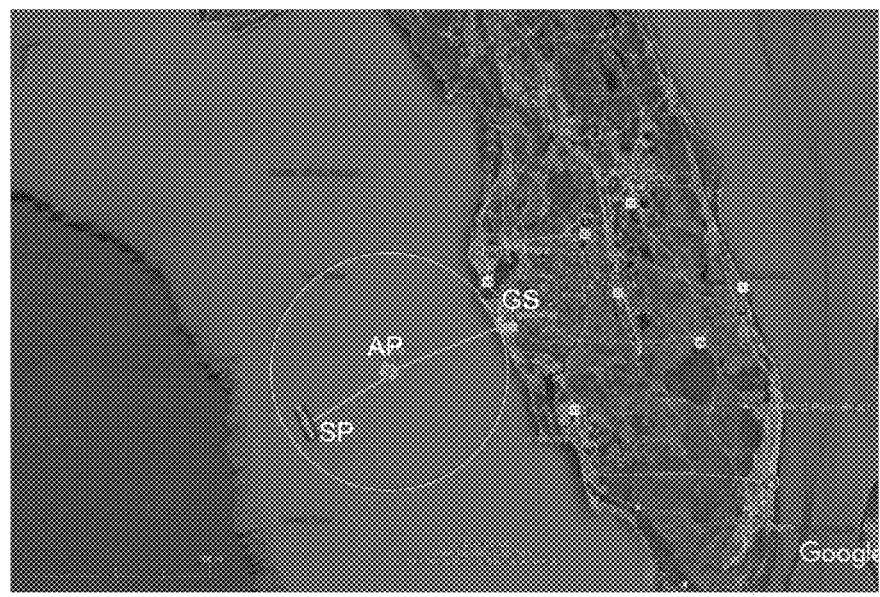
FIGS. 8A and 8B are diagrams of an example of ranges of APs, according to various embodiments.
Figure 8B:
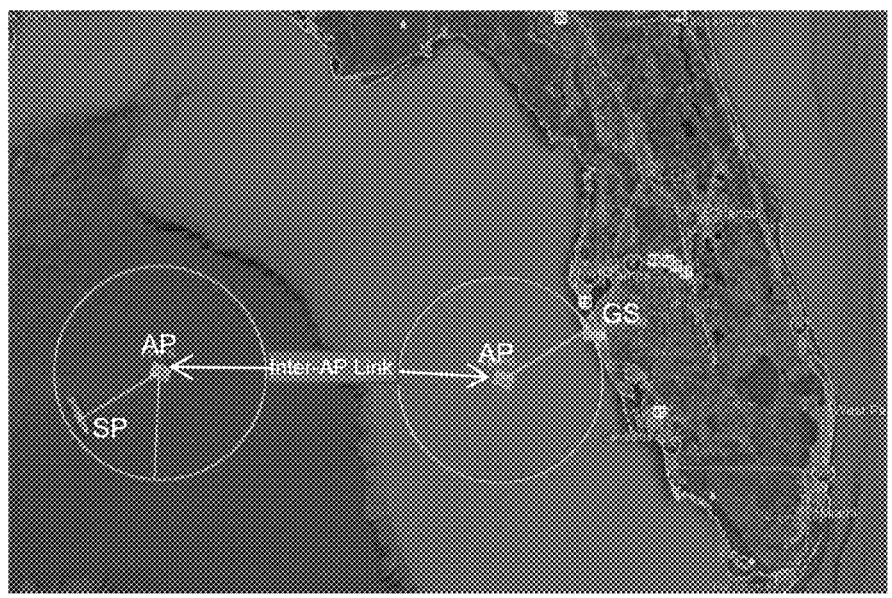

FIGS. 8A and 8B are diagrams of an example of ranges of APs, according to various embodiments. For example, as illustrated in FIG. 8A, the AP 10 may cover an area up to a 100 km radius or 31,000 km$^2$ area. FIG. 8A illustrates an example of a AP 10 serving the service platform 50 on the coast of Florida, where the service platform 50 is a cruise ship, by way of example. It will be understood that, while FIG. 8A illustrates the AP 10 serving a single service platform 50, in other embodiments, the AP 10 may serve a plurality of the service platforms 50.

While FIGS. 1-8A illustrate a single AP 10, in some embodiments, a plurality of APs 10 may be provided, as illustrated in the example shown in FIG. 8B. FIG. 8B illustrates an example of in which an AP 10 is in communication with the ground station 30, and the AP 10 is in inter-AP connection with a second AP 10 serving the service platform 50 located of the coast of Florida. In various embodiments, the APs 10 may be communicatively connected to each other via radio frequency (RF) and/or laser connectivity. As such, the APs 10 in some embodiments may be provided with interface circuitry and antennas communicatively connected to the controller 110 for the RF and/or laser connectivity. Here, the APs 10 may be the same. However, in some embodiments, the APs 10 may be different. For example, the AP 10 closer to the ground station 30 may have a shorter communication radius as compared to the AP 10 in communication with the service platform 50. Additionally, or alternatively, in some embodiments, the AP 10 in communication with the ground station 30 may have a different configuration than the AP 10 in communication with the service platform 50. Additionally, while the range of the APs 10 is illustrated in FIG. 8B as being approximately the same, this is only an example, and in some embodiments, the ranges may be different. Multiple APs allow for range extension and backhauling between the ground station 30 and service platform 50. Additionally, while FIG. 8B illustrates the APs 10 serving a single service platform 50, this is only an example and, in some embodiments, each of the APs 10 may serve one service platform 50 or a plurality of service platforms 50.

A communication payload of the AP 10 may be bent pipe or regenerative. Bent pipe refers to receiving an uplink signal at a specific frequency, boosting its power, and transmitting the signal right back down on the downlink channel at different frequency without further modification of the signal. In other words, the AP 10 just relays the signal. Regenerative refers to receiving the uplink signal at a specific frequency, demodulating the RF carrier to baseband, regeneration of the signals and modulating the regenerated signals, boosting the power, and transmitting the signal down on the downlink channel at different frequency. Regenerative processing allows for improvements in signal-to-noise ratio (SNR) and increased flexibility.

As described above, the AP 10 may include the one or more batteries 150 for energy storage and thus may maintain a nominal altitude at 20 km for a long period of time before descending back to Earth. It is expected that the length of time the AP 10 may stay airborne will continue to increase, for example, to six months or more before descending down to Earth, primarily due to advancement in battery technology. Due to a bi-annual platform maintenance/service cycle, opportunities for technology refresh both for the AP 10 itself and for its communication payload is available at a much faster rate than possible with satellites. For example, as battery technologies improve with electric vehicles and solar technology improves with alternative energy research and development, these improvements may easily be incorporated into the AP 10.

The AP 10 may operate at a same location for a long period of time and/or may be programmed to move to specific locations based on way points. For example, the controller 110 may receive control information, and may control the propellers 130 based on the control information to move to the specific locations based on the way points.

Figure 9:
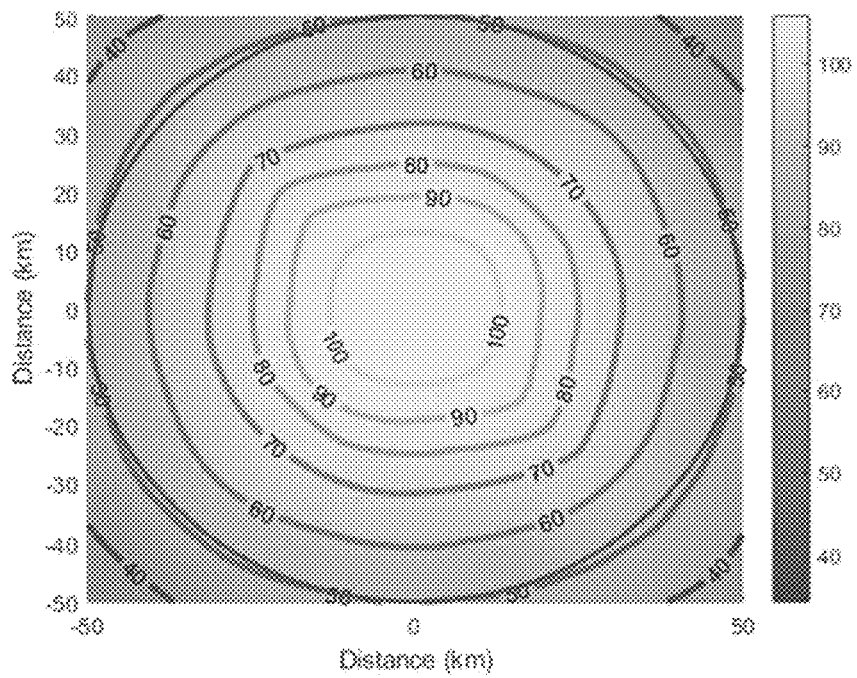
FIG. 9 is a diagram of an example of data rate versus footprint of a AP, according to an embodiment.

FIG. 9 is a diagram of an example of data rate versus footprint of the AP 10, according to an embodiment. FIG. 9 shows an example for an expected data rate over the footprint. As shown in FIG. 9, when the service platform 50 is right under the AP 10, 100 Mbps data throughputs may be achieved, but at the edge of the footprint the data rate reduces to 50 Mbps. Because the AP 10 is a mobile platform, the AP 10 may be moved to maximize data throughput which is particularly useful during adverse weather events, such as heavy rain. Hence, the AP 10 may be positioned to maximize total capacity considering all the service platform 50 and the ground station 30 located inside the footprint coverage of the AP 10.

Additionally, the first antennas 15 of the AP 10 may provide beam forming tracking similar to a terrestrial Base station (BS) antenna and, therefore, the beam peak performance may be pointed at the service platform 50 and/or at the ground station 30 and continue tracking the service platform 50 and/or the ground station 30 at the beam peak for the highest throughput performance.

The AP 10 has no gasoline requirements and may operate with battery technology that powers the two or more propellers 130 attached to the wings in the case of a fixed-wing AP. During the day the batteries 150 may be charged using solar power technology. During the night, the stored battery energy may be used to power both the propellers 130 and the communication payload, e.g., antennas, power amplifiers, filters, etc., to provide data connectivity, with power to the propellers 130 being of the highest priority. As a result, data throughput may be disadvantaged, particularly at night.

In some embodiments, the AP 10 may be seamlessly integrated with 5G radio technology, and thus ensure reachability, reliability, and system resiliency. The AP 10 may fly at a much lower altitude than that of satellites which enables the AP 10 to provide fiber-like latency to applications on the ground, for example, end-to-end latency in the order of 50 msec or lower.

Returning to FIG. 1, unlike a fixed terrestrial base station bolted to a steel tower, the AP 10 has mobility and thus may be deployed in areas with limited or no terrestrial connectivity to augment broadband connectivity to the Internet. The AP 10 thus provides enhanced broadband connectivity to service platform(s) 50 to which such broadband connectivity would otherwise not be possible or to which such broadband connectivity would be difficult, such as cruise ships, connected vehicles, Internet of Things (IoT) device and platforms, 4G/LTE & 5G base station Cellular backhaul (CBH), fixed broadband terminals (e.g., at schools and homes, particularly rural schools and rural homes), direct-to-handset, etc.

Here, various use cases are discussed by way of example. The cruise ship, the connected vehicle, and the airplane are mobile examples. The IoT, 4G/LTE & 5G base station Cellular backhaul, and fixed broadband terminals may be fixed. Direct-to-handset may be both mobile and fixed depending on the platform on which the smartphone is positioned.

For example, end users on a cruise ship may expect a similar user experience (e.g., data throughput and low latency) on the end users' smartphones as they would on the ground. A cruise ship operates remotely offshore with limited or no terrestrial infrastructure. Today, geosynchronous satellites are predominately used to provide Internet connectivity to cruise ships but with limited throughput and large propagation delay. The communication system according to various embodiments may provide terrestrial-like user experience on cruise ships in several ways, for example, direct-to-handset connectivity to end users, or VSAT Cellular Backhaul (CBH) connectivity for broadband Internet. Due to significantly lower altitude of the AP 10 compared to geosynchronous satellites (20 km versus 35786 km), the user experience may be the same as terrestrial networks for all applications.

As an another example user case, similarly to the cruise ship, end users on an airplane may expect a similar user experience (e.g., data throughput and low latency) on the end users' smartphones as they would on the ground. An airplane operates remotely offshore or at an altitude over the earth such that communication with the ground via terrestrial infrastructure is limited or no possible. Today, geosynchronous satellites are being used to provide Internet connectivity to airline passengers in flight but with limited throughput and large propagation delay. The communication system according to various embodiments may provide terrestrial-like user experience to passenger on airplanes while in flight, for example, direct-to-handset connectivity to end users, or VSAT Cellular Backhaul (CBH) connectivity for broadband Internet. Due to significantly lower altitude of the AP 10 compared to geosynchronous satellites (20 km versus 35786 km), the user experience may be the same as terrestrial networks for all applications.

As another example use case, the connected vehicle may also benefit from the low latency and high data throughput experience. IoT devices and platforms are typically low duty-cycle devices. Since the AP 10 may be mobile, the AP 10 may cover a large swatch of area and the communication system according to various embodiments may service many low duty-cycle IoT devices at the same time and thus improve communication efficiency. The AP 10 may also enable 4G/LTE & 5G base station Cellular backhaul and fixed broadband terminals to interconnect remote locations to the Internet. The direct-to-handset is a smart phone that may be on a mobile platform or at relatively fixed location on the ground. It is noted that the International Telecommunications Union (ITU) has recently allocated worldwide a large swatch of spectrum for HAPS.

Multiple-Input-Multiple-Output (MIMO)

One limitations of an AP platform, such as the AP 10, is lack of DC power to simultaneously power the propellers 130 and provide payload data communication service. This is especially true during the night when lack of solar power results in finite battery power that must be rationed until dusk. As a result, data throughput service may be disadvantaged at night. Additionally, for an AP system there is a direct relationship between weight and power. If the total weight of the AP 10 is reduced more power is available during the day and night for the communication payload and the services such as data connectivity provided by the communication payload. A metric to optimize the AP 10 is power per kilogram. Thus, reducing communication payload component weight (e.g., weight of antennas, power amplifiers, etc.) results in more power to drive the propellers and keep the AP 10 at a same nominal altitude.

The application of Multiple-Input Multiple-Output (MIMO) technology may address the limited DC power constraints and/or reduce payload component weight on the AP 10. More specifically, Line of Sight (LoS) MIMO is a technology that exploits the spatial dimension with multiple transmit and receive antennas. LoS MIMO provides an intelligent interference management system that allows for multiple steams of data to co-exist in a same medium (spectrum) without interference. Compared to a related art Single-Input Single-Output (SISO) communication system, MIMO, for example, 2×2 MIMO, may double data throughput while keeping SISO resources, such as bandwidth, polarization, total AP power, and/or coverage zone, fixed.

Here, single-input single-output (SISO) denotes a related art radio system where neither transmitter nor receiver has multiple antennas. In wireless communications, the term MIMO generally refers to the use of multiple antennas at the transmitter and the receiver. MIMO refers to a technique for sending and receiving more than one data signal simultaneously over the same radio channel. It is noted that MIMO is fundamentally different from smart antenna techniques developed to enhance the performance of a single data signal, such as beamforming and diversity.

Assuming the transmit power of a SISO system is 10 W at the single antenna, the SISO system would require power amplifiers and antennas sufficient to transmit at 10 W. By contrast, the transmit power of the MIMO system (assuming 2×2 MIMO) would be 5 W per antenna. Hence, the total power for the MIMO system is 10 W, which is the same as the SISO system. However, because the MIMO system may use two antennas, each transmitting at 5 W, the components may be smaller and thus lighter, while achieving twice the throughput as the SISO system (assuming 2×2 MIMO). Typically, the weight of the additional antenna(s) for MIMO is a small fraction of the total weight of the payload. Alternatively, the MIMO may be configured to achieve the same throughput as SISO but with 2.5 W per antenna (quarter of the power per antenna compared to the original 10 W SISO power).

Thus, the AP 10 according to various embodiments incorporates MIMO technology. For example, MIMO technology may be used for the service link, for the feeder link, or for both the service link and feeder line. That is, MIMO technology may be used for both on the return link (service platform to ground station) and forward link (ground station to service platform).

Using the use case of the cruise ship, one characteristic of the cruise ship is the large real estate available on the deck. As illustrated in FIG. 3A and described above, the deck of a cruise ship allows for multiple antennas on the ship to be placed at known distances from each other. As described above, the third antennas 55 may be parabolic dishes or flat panel antennas. Similarly, large real estate is also available on roof tops of schools and homes, semi-trailer vehicles, connected vehicles, etc. described above as examples of the service platform 50.

Similarly, on the AP 10, real estate is also available for multiple first antennas 15, for example on the wings as discussed above. Accordingly, the size of the first antennas 15 may be smaller and as such reduce the total antenna weight. Moreover, in some embodiments, flat panel antennas may be used as the first antennas 15 and may be conformal to the wings, and thus the flat panel antennas do not significantly contribute to the overall payload weight. Multiple flat-panel antennas may thus be provided on the wings or body frame of the AP 10 to provide MIMO connectivity.

The spacing between the antennas on the AP 10, on the service platform 50, and at the ground station 30, is a function of the operational frequency and slant range distance between the AP 10 and the service platform 50, and between the AP 10 and the ground station 30.

As described above, FIG. 5 shows different spacings between the first antennas 15 on the AP 10 and the third antennas 55 on the service platform 50 or the second antennas 35 on the ground station 30 for Ku-band (12 GHz) and Ka-band (18 GHz) assuming a slant range of 40 km. As illustrated in FIG. 5, there is a direct relationship between the antenna spacing on the ground station 30 or service platform 50, and the antenna spacing on the AP 10. The spacing shown in FIG. 5 maximizes the MIMO capacity. The MIMO capacity degrades gracefully even when parameters like the slant range change over time. As discussed below, a 3D orientation of the antennas of the service platform and/or the ground station may be dynamically adjusted physically and/or electronically to optimize MIMO capacity.

Moreover, MIMO technology may also be used to reduce the space, weight and power (SWaP) on the AP 10, reduce total power, and/or reduce the bandwidth for communication. For example, MIMO, e.g., 2×2 MIMO, may be used to increase throughput by factor of two (same total power, spectrum, and polarization), reduce spectrum by factor of two (while maintain the same SISO throughput, same total power, polarization), and/or reduce total power by factor of two (while maintaining same SISO throughput, spectrum, and polarization). The reduced power may be achieved by using smaller antennas on the AP 10, or using a smaller power amplifier on the AP 10, or both, to achieve reduced SWaP on the AP 10.

Operationally, the antenna orientation of the AP 10 is always changing relative to the ground antennas, whether on the service platform or the ground station. LoS MIMO technology is sensitive to the relative orientation of transmit and receive antennas.

To compensate for the movement of the AP 10 and the resulting change in position and orientation of the AP 10, the number of third antennas 55 at the service platform 50 and/or the number of second antennas 35 at the ground station 30 may each be greater than the number of antennas on the AP 10. For illustrative purposes, and without loss of generality, assume three antennas at the service platform and two antennas on the AP 10. According to various embodiments, the controller 210 of the service platform 50 may select a subset of the third antennas 55 on the service platform 50 to maximize the data throughput and/or minimize power usage on the AP 10.

Figure 10A:
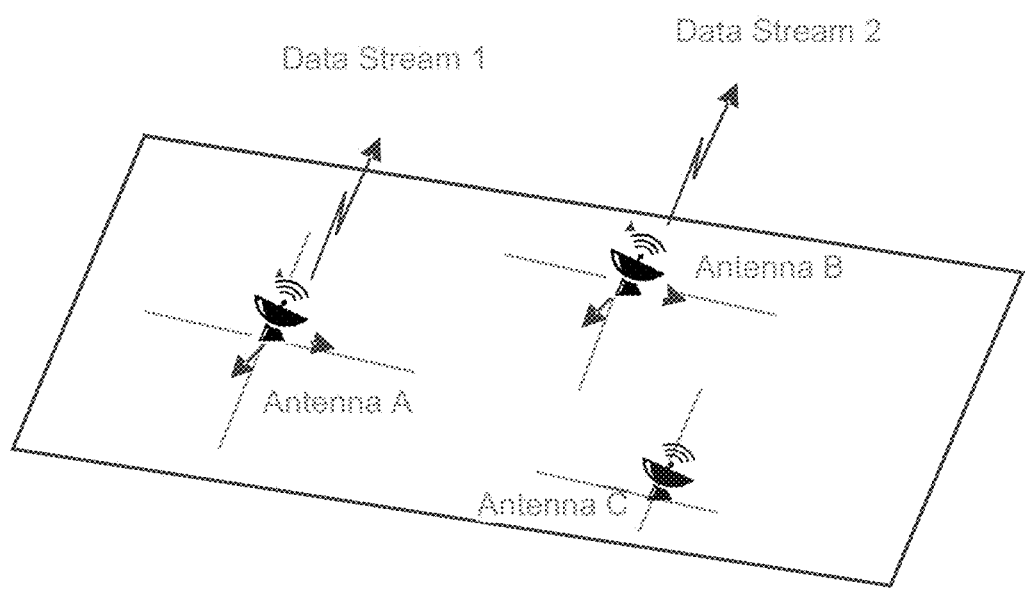
FIGS. 10A and 10B are diagrams of examples of selection of antennas in a three antenna configuration, according to various embodiments.
Figure 10B:
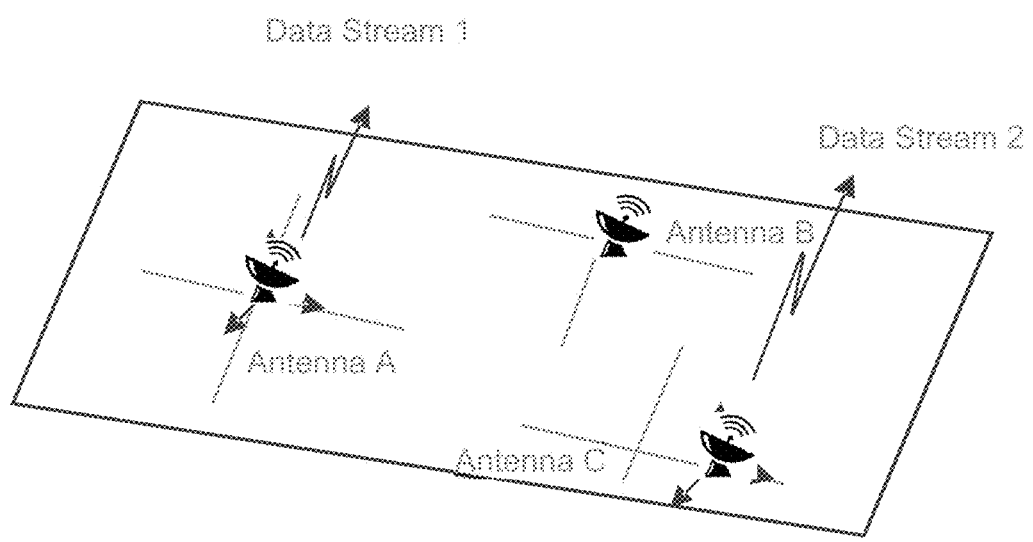

FIGS. 10A and 10B are diagrams of examples of selection of antennas in a three antenna configuration, according to various embodiments.

As an example, as shown in FIG. 10A, the service platform 50 may be provided with three third antennas 55, including Antenna A, Antenna B, and Antenna C. For the example, a subset of the three antennas that includes Antenna A and Antenna B may be selected to transmit Data Stream 1 and Data Stream 2 to the AP 10, based on activity of the AP 10. In some embodiments, Antenna C may not be used for transmission of data to the AP 10 while Antenna A and Antenna B transmit Data Stream 1 and Data Stream 2, respectively, to the AP 10. However, in other embodiments, Antenna C may be used for other purposes, or for purposes that do not require high throughput, for example, to provide control information or other information for which high data rate transmission is not needed (for example, in a SISO configuration). In more detail, the controller 210 may receive information related to the AP 10, including, for example, orientation information of the AP 10, and may select the subset of the three antennas including the Antenna A and the Antenna B, based on the received orientation information. The controller 210 then controls the Antenna A and Antenna B to transmit the Data Stream 1 and the Data Stream 2, respectively, to the AP 10. While the example is illustrated based on transmitting Data Stream 1 and Data Stream 2 to the AP 10, embodiments are not limited and, according to other embodiments, the subset of third antennas 55 may be selected, based on the control information, for receiving data streams from the AP 10.

As another example, as shown in FIG. 10B, the service platform 50 may select a subset of the three third antennas 55 including Antenna A and Antenna C to transmit the Data Stream 1 and the Data Stream 2, respectively, to the AP 10, based on activity of the AP 10. In some embodiments, Antenna B may not be used for transmission of data to the AP 10 while Antenna A and Antenna C transmit Data Stream 1 and Data Stream 2, respectively, to the AP 10. However, in other embodiments, Antenna B may be used for other purposes, or for purposes that do not require high throughput, for example, to provide control information or other information for which high data rate transmission is not needed. In more detail, the controller 210 may receive control information, including, for example, orientation information of the AP 10, and may select the subset of the three antennas including the Antenna A and the Antenna C, based on the received orientation information. The controller 210 may control the Antenna A and Antenna C to transmit the Data Stream #1 and the Data Stream #2, respectively, to the AP 10. As with the example illustrated in FIG. 10B, the example illustrated in FIG. 10B is based on transmitting Data Stream 1 and Data Stream 2 to the AP 10. However, embodiments are not limited and, according to other embodiments, the subset of third antennas 55 may be selected, based on the control information, for receiving data streams from the AP 10.

In the example of FIGS. 10A and 10B, the controller 210 may receive first control information in a first time period, and select the subset of third antennas 55, including Antenna A and Antenna B, as illustrated in FIG. 10A, based on the first control information for transmission of Data Stream 1 and Data Stream 2 to the AP 10 during the first time period. The controller 210 may receive second control information in a second time period that is different than the first time period, and select the subset of third antennas 55, including Antenna A and Antenna C, as illustrated in FIG. 10B, based on the second control information for transmission of Data Stream 1 and Data Stream 2 to the AP 10 during the second time period. Here, Antenna C is not used for transmission to the AP 10 during the first time period, and Antenna B is not used for transmission to the AP 10 during the second time period. Thus, the subset of antennas may be selected based on a current orientation of the AP 10 that optimizes capacity for the current orientation.

In the examples in FIGS. 10A and 10B, the controller 210 selects the subset of antennas based on the orientation information. However, embodiments are not limited to selection based on orientation information and, in some embodiments, the control information may include other parameters related to the AP 10, such as position information of the AP 10, speed information of the AP 10, weather conditions, temperature conditions, altitude information of the AP 10, and/or other parameters associated with the activity of the AP 10, and the controller 210 may select the subset of the antennas based on one or more of the position information of the AP 10, the speed information of the AP 10, the weather conditions, the temperature conditions, the altitude information of the AP 10, or the other such parameters, either alone or in combination with the orientation of the AP 10.

In the examples illustrated in FIGS. 10A and 10B, the controller 210 selects two antennas as the subset of the three antennas, this is only an example. In some embodiments, only one antenna of the three antennas may be selected. Additionally, in other embodiments, all of the three antennas may be selected.

The throughput for LoS MIMO is a function of the minimum number of antennas on the service platform 50 and on the AP 10. For example, for 3×2 MIMO, three antennas on the service platform 50 and two antennas on the AP 10, the LoS MIMO capacity may double because the number of antenna on the AP 10 is two, which is the limiting case. However, it is possible to improve the link margin by using all the antennas on the service platform 50. Here, the term link margin means a difference between a minimum signal obtained and the actual received signal power. In some embodiments, the controller 210 may select all three antennas on the service platform 50 for transmission to improve the link margin. For example, in some embodiments, the controller 210 may select all the antennas on the service platform 50 during certain periods of time based on the activity of the AP 10 to improve the link margin. In more detail, in some embodiments, the controller 210 may select all of the third antennas 55 on the service platform during certain periods of time based on the orientation of the AP 10 to improve the link margin at the receiver.

In addition to selecting a subset of the third antennas 55, the controller 210 may also control individual ones of the subset of antennas to move physically or electronically in at least one dimension of three dimensions relative to other ones of the subset of antennas to optimize capacity. That is, as illustrated in the example of FIGS. 10A and 10B, the third antennas 55 on the service platform 50 may be controlled to individually move in X, Y, or Z directions. Thus, even though the antenna spacing may be imperfect for a given orientation of the AP 10, the individual third antennas 55 of the subset may be moved individually to achieve capacity close to a maximum LoS MIMO capacity. The MIMO capacity is forgiving over large distances and orientations.

The example illustrated in FIGS. 10A and 10B shows three third antennas 55 on the service platform 50 as parabolic dish antennas, where each of the third antennas 55 may move independently in the X, Y, or Z direction to maximize capacity. In more detail, the controller 210 may receive the control information as described above, and may control individual third antennas 55 to physically move in the X, Y, and/or Z directions, based on the control information, to maximize the throughput of the Data Stream 1 and the Data Stream 2. For example, in the embodiment illustrated in FIG. 10A, the controller 210 may select the subset of third antennas 55 including Antenna A and Antenna B, and may control Antenna A based on the control information and may control Antenna B based on the control information, to maximize the throughput of transmission of Data Stream 1 and Data Stream 2 by Antenna A and Antenna B, respectively. A similar control may be provided for the example illustrated in FIG. 10B, and thus repeated description thereof is omitted for conciseness.

Figure 11:
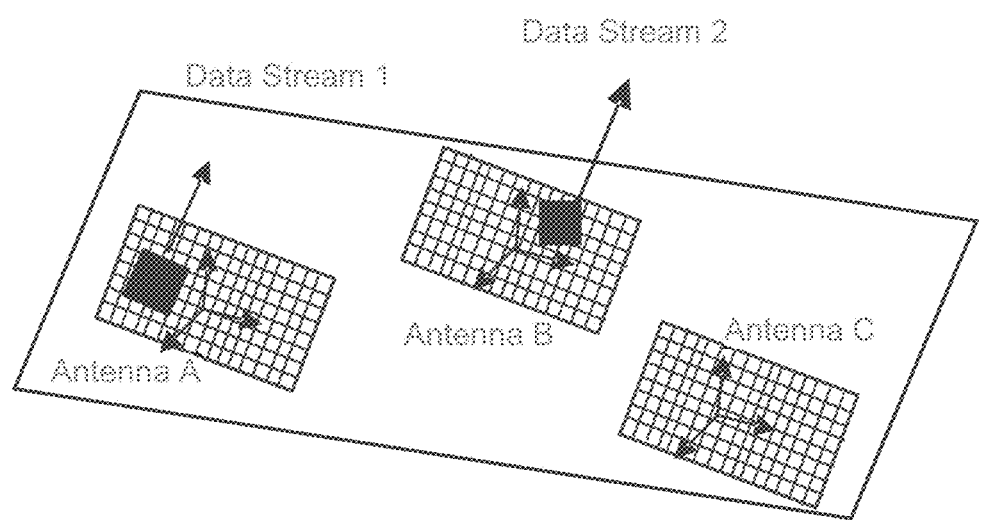
FIG. 11 is a diagram of an example of selection of antennas in a configuration with three phased array antennas, according to various embodiments.

FIG. 11 is a diagram of an example of selection of antennas in a configuration with three phased array antennas, according to various embodiments. FIG. 11 shows a similar example to FIGS. 10A and 10B, except the third antennas 55 are phased array antennas rather than parabolic dish antennas.

In the example illustrated in FIG. 11, the controller 210 may receive the control information and select a subset of the third antennas 55, including Antenna A and Antenna B for transmission of the Data Stream 1 and the Data Stream 2, respectively, to the AP 10. Additionally, the three flat panel antennas may each move independently in the X, Y, and/or Z direction as with the parabolic antennas illustrated in FIGS. 10A and 10B. In other words, each panel may move in the X, Y, and/or Z direction. The flat panel antenna may include, for example, a dipole placed in front of a flat-panel reflector, and may include multiple bays each with an individual dipole in front of a shared reflector.

Additionally, in some embodiments, the flat panel antennas may include phased array antennas. A phased array antenna may be an electronically scanned antenna array, such as a computer-controlled array of antenna elements which creates a beam of radio waves that may be electronically steered to point in different directions without moving the antennas. The radio frequency current from the transmitter is fed to the individual antenna elements that are arranged in a planar or linear configuration with a differential phase relationship so that the energy from the separate elements add together to increase the far-field power in a desired direction and suppress radiation in undesired directions. Accordingly, each phase array antenna may include a plurality of antenna elements, and a subset of the antenna elements in the phased array antenna for each phased array antenna may be illuminated to increase or decrease a distance between the different independent beams from the flat panel antennas. In other words, in the example illustrated in FIG. 11, the controller 210 may control the whole panel to move in the X, Y, and/or Z direction, and additionally or alternatively, the controller 210 may control individual antenna elements of each panel to illuminate or not.

Figure 12:
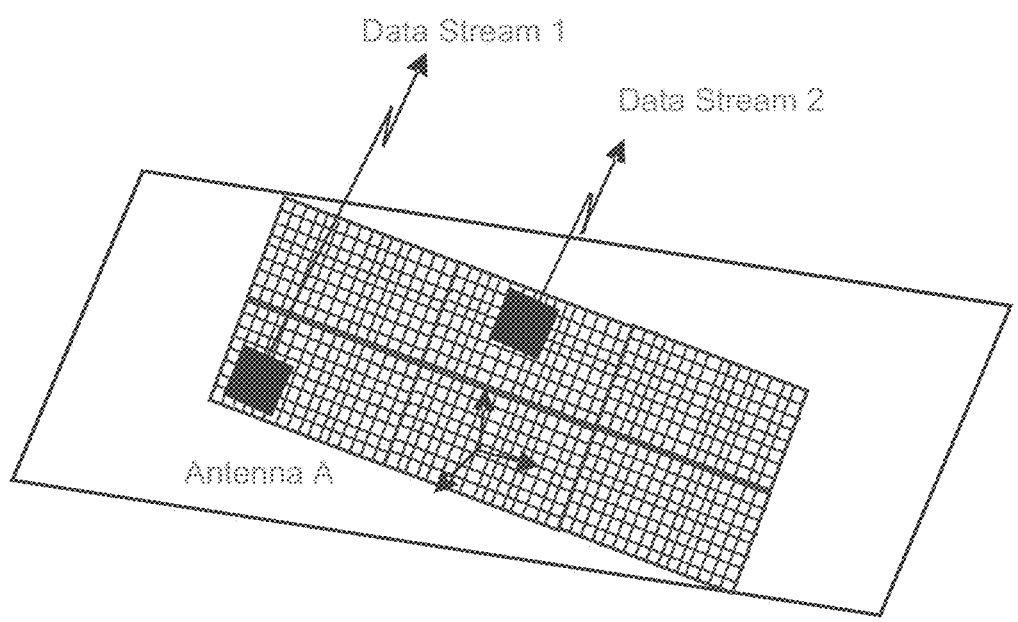
FIG. 12 is a diagram of an example of subset illumination in a configuration with a single phased array antenna, according to various embodiments.

FIG. 12 is a diagram of an example of subset illumination in a configuration with a single phased array antenna, according to various embodiments. FIG. 12 shows a similar example to FIG. 11, except that a single flat panel antenna is provided with plural subpanels.

In the embodiment illustrated in FIG. 12, the controller 210 may control the whole panel to move in the X, Y, and/or Z direction. Additionally or alternatively, different subpanels may be illuminated or not to increase or decrease a distance between the different independent beams from the panel. Additionally, or alternatively, multiple subset areas of antenna elements of the panel may be illuminated or not to increase or decrease a distance between the different independent beams from the panel.

Due to the dynamic movement of the AP 10 both in orientation and distance relative to the service platform 50, the spacing between the antennas is always changing. In other words, the relative spacing between the first antennas 15 on the AP 10 and the third antennas 55 on the service platform 50 is always changing. However, the AP 10 moves slowly relative to the service platform 50 and/or the ground station 30/240, and as a result the relative spacing between the antennas changes slowly, typically on the order of a few minutes or more. Gradual changes in the orientation of the AP 10 and the resulting relative spacing changes between the AP 10 and the service platform 50 and between the AP 10 and the ground station 30 allows for algorithm adaptations and convergence to the orientation and selection of antennas that maximizes capacity.

For example, according to various embodiments, the controller 210 may be programmed with and to implement algorithms that optimize capacity. For example, in some embodiments, a deterministic algorithm may be used. In other embodiments, an artificial intelligence (AI) engine or machine learning (ML) may be applied in order to train a model to adapt the algorithm to changing conditions. For example, a data set used for training an AI/ML model may include parameters including, by way of example, a roll, a pitch, and a yaw of the AP 10, and/or a slant range of the AP 10, an elevating angle of the AP 10, and/or an azimuth angle of the AP 10 relative to the service platform 50 and/or the ground station 30 or relative to various individual third antennas 55 of the service platform 50 and/or relative to various individual antennas of the ground station 30. For example, some of all of these parameters may be provided to the service platform 50 and/or to the ground station 30 by the AP 10 on a downlink, or may be calculated by the controller 210 of the service platform 50 or the controller of the ground station 30. The operating frequency and spacing between the first antennas 15 on the AP 10 are known. The goal of the ML/AL training is to maximize MIMO capacity by adjusting the selection, spacing and orientation of the third antennas 55 on the service platform 50 or of the antennas of the ground station 30. Examples of feature sets used by the AI/ML engine for the MIMO capacity for the AI/ML model may be aggregate capacity, spatial interference, carrier to noise ratio, bit error rate, block error rate and spectral efficiency. The controller 210 of the service platform 50 may use the trained AI/ML model to select the subset of third antennas 55 based on the parameters of the AP 10, as described above, and/or may use the trained AI/ML model to control the physical or electronic movement of the individual third antennas 55 and/or illumination of antenna elements, based on the parameters of the AP 10, as described above.

With reference to the embodiments illustrated in FIGS. 10A-12, in some embodiments, the MIMO system may be reconfigured as single-input-single-output (SISO) system by simply "turning-off", as an example, two of the three third antennas 55, or in the case of the embodiment illustrated in FIG. 12, turning off all but one subpanel. The ability to switch from MIMO system to SISO system may be advantageous in anomalous situations. For example, the AP 10 may be provided with one or more sensors, and when the system detects an anomaly based on signals from the one or more sensors on the AP 10 and/or on the service platform 50 (or the ground station 30/240), the controller 110 of the AP 10 may control the antennas such that only one transmit antenna will be enabled and only one antenna on the service platform 50 (or the ground station 30) will be enabled, effectively making the communication system a SISO configuration.

For the configuration shown in FIG. 12, the full panel or part of the panel may be used in the SISO system. For example, one or the AP 10 or the service platform 50 that is receiving the transmission may detect whether MIMO or SISO is being used and change accordingly.

While the embodiments illustrated above with reference to FIGS. 10A to 12 have been described with reference to the third antennas 55 on the service platform 50, the function and operation with respect to the second antennas 35 at the ground station 30 is similar. Accordingly, the same description above also applies to selection of second antennas 35 and movement of second antennas 35 at the ground station 30 and thus repeated description thereof is omitted for conciseness.

As described above, the controller 210 selects the subset of antenna and controls movement thereof based on information related to the activity of the AP 10. The location and orientation of the AP 10 may be determined from GPS data using the control signals already received on the ground. Additionally, the information related to the AP 10 may be provided by a low bandwidth in-band signal from the AP 10, and used to update a current location and orientation of the AP 10.

Figure 13:
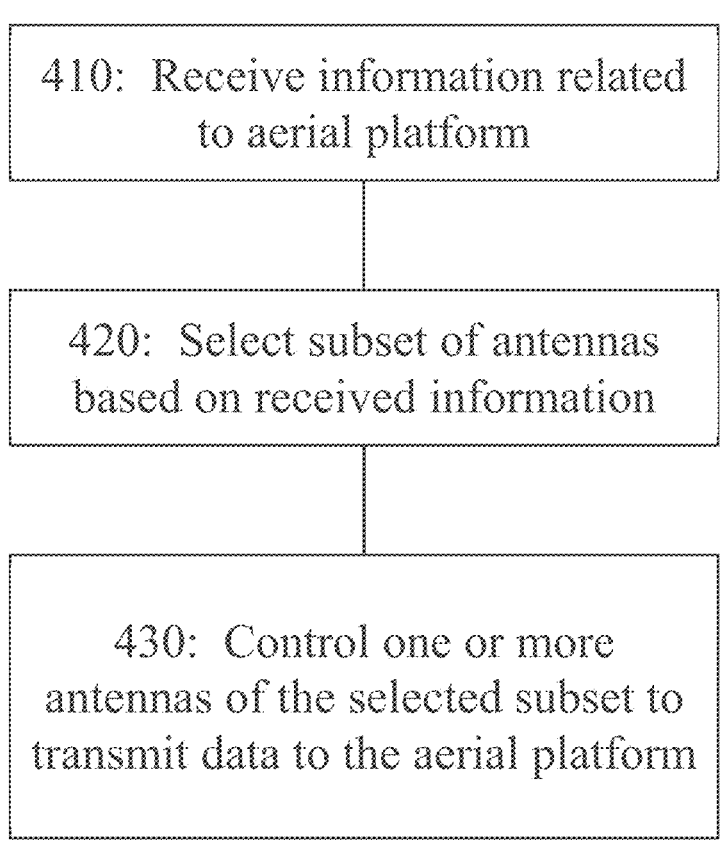
FIG. 13 is a flow chart of an example process 400 implemented by the communication system 1, according to various embodiments.

FIG. 13 is a flow chart of an example process 400 implemented by the communication system 1, according to various embodiments. In some implementations, one or more process blocks of FIG. 13 may be performed by the controller 210 of the service platform 50 or the controller 310 of the ground station 30. In some implementations, one or more process blocks of FIG. 13 may be performed by another device or a group of devices separate from or including the controller 210 of the service platform 50 or the controller 310 of the ground station 30.

As shown in FIG. 13, process 400 may include receiving information related to the AP 10 (block 410). For example, the controller 210 of the service platform 50 may receive information related to the AP 10 via in-band communication from the AP 10 or via separate transmission from the AP 10 or other device, as described above.

As further shown in FIG. 13, process 400 may include selecting a subset of antennas based on the received information (block 420). For example, the controller 210 of the service platform 50 may select the subset of third antennas 55 based on the received information, as described above. For example, in some embodiments, the controller 210 may receive an orientation of the AP 10, and may select a subset of the third antennas 55 based on the orientation.

As further shown in FIG. 13, process 400 may include controlling one or more antennas of the selected subset of antennas to transmit data to the AP 10 (block 430). For example, the controller 210 of the service platform 50 may control one or more third antennas 55 of the subset of third antennas 55 to transmit data to the AP 10, as described above.

In some embodiments, block 430 may further include individually controlling the one or more antennas of the subset of antennas to move physically or electronically in at least one of the X, Y, and Z directions to maximize the throughput of the data, as described above with reference to FIGS. 10A and 10B.

In some embodiments, block 430 may include controlling different subpanels of the one or more antennas to be illuminated or not to increase or decrease a distance between the different independent beams from the panel, as described above with reference to FIG. 11.

In some embodiments, block 430 may include controlling multiple subset areas of antenna elements of the panel to be illuminated or not to increase or decrease a distance between the different independent beams from the panel, as described above with reference to FIG. 12.

In some embodiments, block 420 may include selecting the subset of antennas using a trained AI/ML model as described above.

Although FIG. 13 shows example blocks of process 400, in some implementations, process 400 may include additional blocks, fewer blocks, different blocks, or differently arranged blocks than those depicted in FIG. 13. Additionally, or alternatively, two or more of the blocks of process 400 may be performed in parallel.

According to various embodiments, both MIMO equalization at the receiver (i.e., at the AP 10, the service platform 50, or at the ground station 30) and/or MIMO precoding at the transmitter (i.e., at the AP 10, the service platform 50, or at the ground station 30) may be used to compensate for differential changes to a geometry and a phase of the received signal. For example, in some embodiments, a low-bandwidth feedback link may be provided for a MIMO precoding algorithm. Here, MIMO equalization refers to reversing distortion incurred by the signal transmitted through a channel in order to render a flat frequency response flat from end to end. Examples of MIMO equalization techniques include adaptive equalizer, zero-forcing equalizer, or minimum mean square error (MMSE) equalizer. The MIMO equalizer may use filtering or other methods to remove the effect of inter-symbol interference (ISI) so that the reliability of data transmission is maintained. Precoding is a generalization of beamforming to support multi-stream (or multi-layer) transmission in multi-antenna wireless communications. In conventional single-stream beamforming, the same signal is emitted from each of the transmit antennas with appropriate weighting (phase and gain) such that the signal power is maximized at the receiver output. In point-to-point systems, such as LoS MIMO, MIMO precoding means that multiple data streams are emitted from the transmit antennas with independent and appropriate weightings such that the link throughput is maximized at the receiver output. The MIMO precoding may include spatial processing that occurs at the transmitter. When the receiver has multiple antennas, the transmit beamforming cannot simultaneously maximize the signal level at all of the receive antennas, and MIMO precoding with multiple streams is often advantageous.

While the embodiments illustrated in FIGS. 10A-12 are described with reference to an AP 10 having two antennas and a service platform 50 having three antennas, this is only an example. In other embodiments, for a AP 10 having two antennas (e.g., 2×2 MIMO), the service platform 50 may have three of more third antennas 55. In still other embodiments, for an AP 10 having three antennas (e.g., 3×3 MIMO), the service platform 50 may have four or more third antennas 55. This may be extended. For example, for an AP 10 having N×N MIMO, the service platform may have a minimum of N+1 third antennas 55. As discussed above, while these examples are given for the service platform 50, the same obtains for the ground station 30. In other words, for an AP 10 having N×N MIMO, the ground station 30 may have a minimum of N+1 antennas.

MIMO Configurations

In the various embodiments described above, MIMO may be provided in various configurations. For example, Table 1 below illustrates different MIMO configurations according to various embodiments with configurations with one or more APs, configurations with one or more antennas per AP, and configurations with a regenerative or bent-pipe payload on the AP.

TABLE 1

MIMO Configurations

| Number of APs | Number of Antennas per AP | AP Payload | Feeder Link | Service Link |
|---|---|---|---|---|
| 1 | 2 or more | Regenerative | Uplink MIMO/Downlink SISO | 4 G/5 G |
| | | | Uplink SISO/Downlink MIMO | |
| | | | Uplink and Downlink MIMO | |
| | | | Uplink MIMO/Downlink SISO | Uplink MIMO/Downlink SISO |
| | | | Uplink SISO/Downlink MIMO | |
| | | | Uplink and Downlink MIMO | |
| | | | Uplink MIMO/Downlink SISO | Uplink SISO/Downlink MIMO |
| | | | Uplink SISO/Downlink MIMO | |
| | | | Uplink and Downlink MIMO | |
| | | | Uplink MIMO/Downlink SISO | Uplink and Downlink MIMO |
| | | | Uplink SISO/Downlink MIMO | |
| | | | Uplink and Downlink MIMO | |
| 1 | 2 or more | Bent-Pipe | Forward Link MIMO/Return Link SISO | |
| | | | Forward Link SISO/Return Link MIMO | |
| | | | Forward Link MIMO/Return Link MIMO | |
| 2 or more | 1 | Bent-Pipe | Forward Link MIMO/Return Link SISO | |
| | | | Forward Link SISO/Return Link MIMO | |
| | | | Forward Link MIMO/Return Link MIMO | |

For APs with regenerative payload architecture where the waveform is demodulated and decoded per link, there are four configurations shown in Table 2 below for LoS MIMO.

TABLE 2

Regenerative Payload with MIMO

| Configuration Name | Algorithm | Direction (uplink or downlink) |
|---|---|---|
| 1 | MIMO equalization | Uplink |
| 2 | MIMO precoding | Uplink |
| 3 | MIMO equalization | Downlink |
| 4 | MIMO precoding | Downlink |

The examples in Table 2 are provided for 2×2 MIMO but, in various embodiments, may be applied for 3×3 MIMO, or N×N MIMO.

Figure 14:
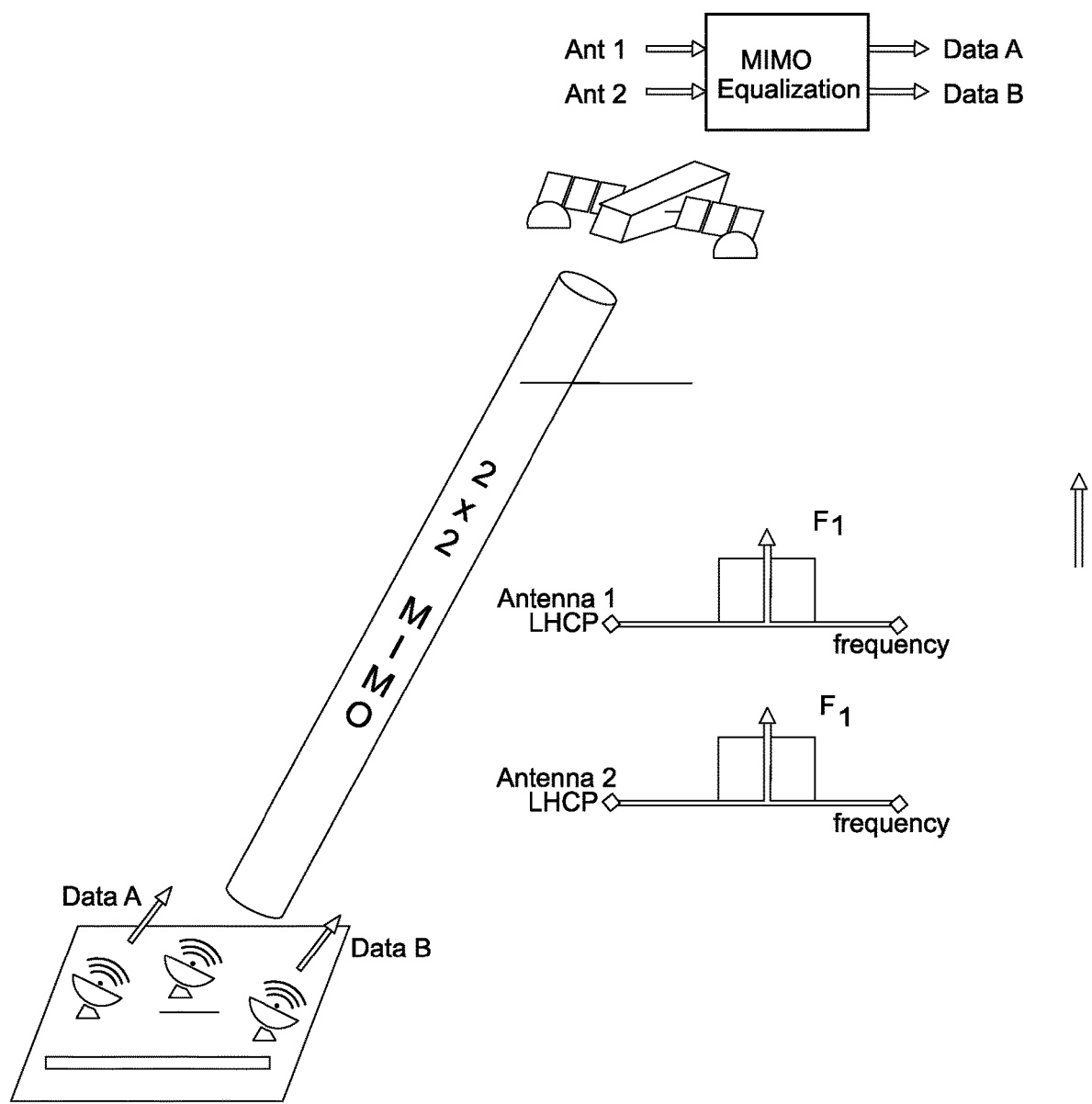
FIGS. 14-17 are diagrams of examples of communication system configurations according to various embodiments.
Figure 15:
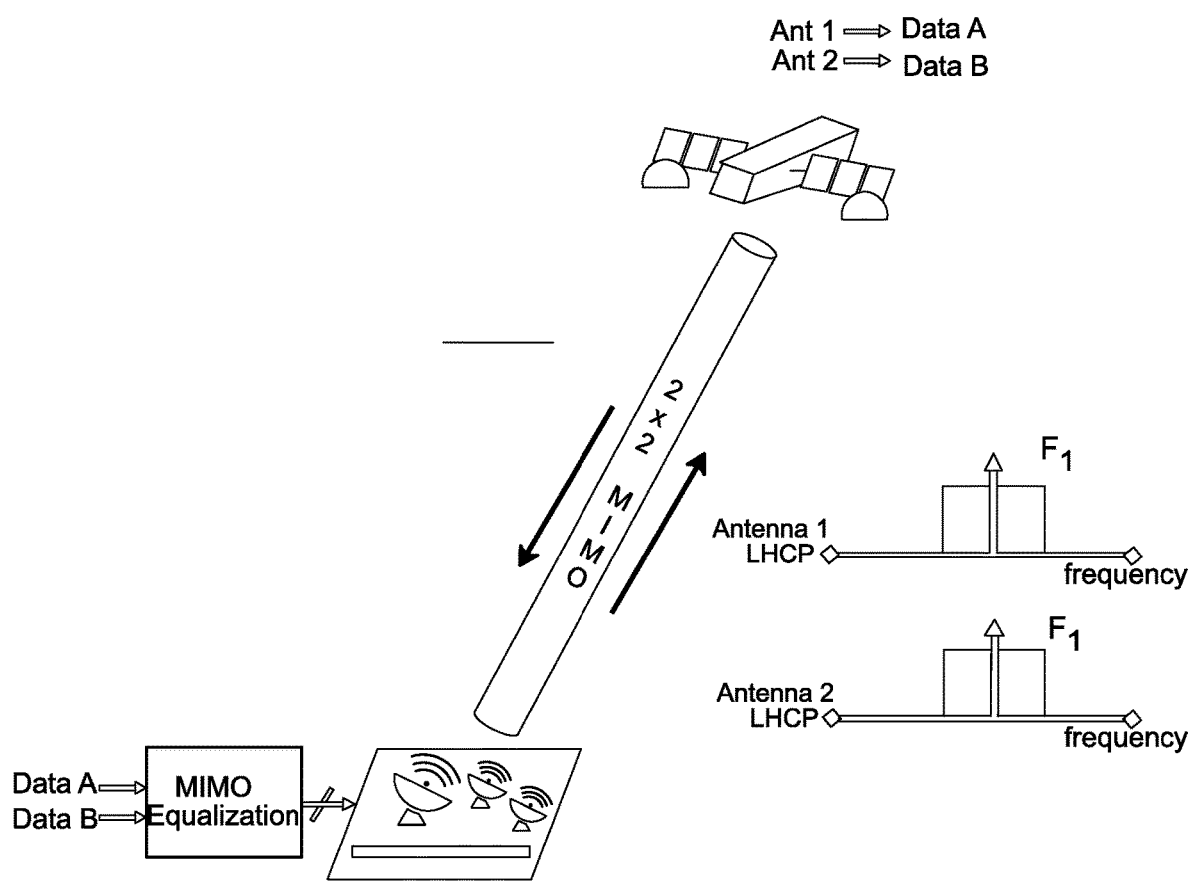
Figure 16:
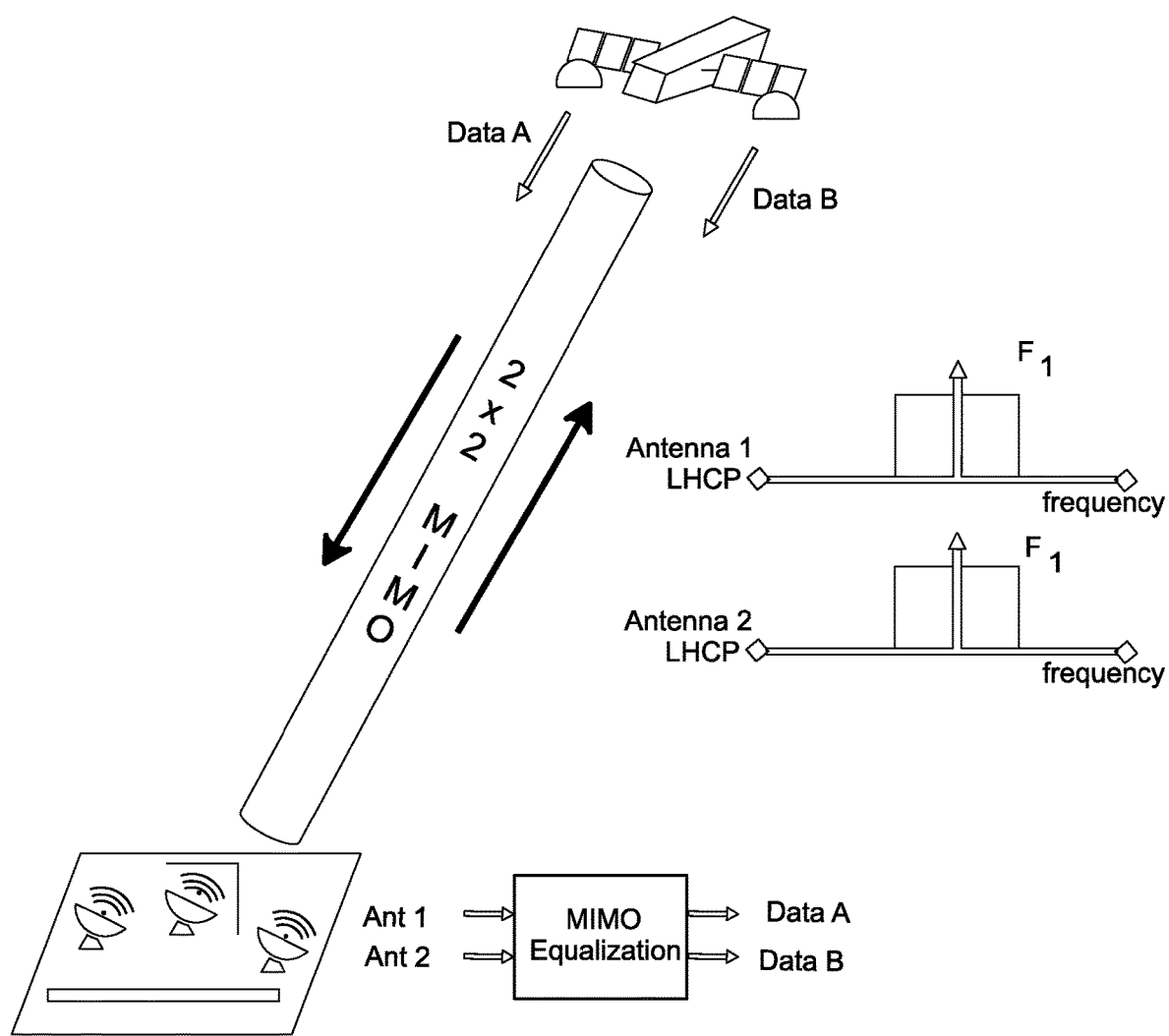
Figure 17:
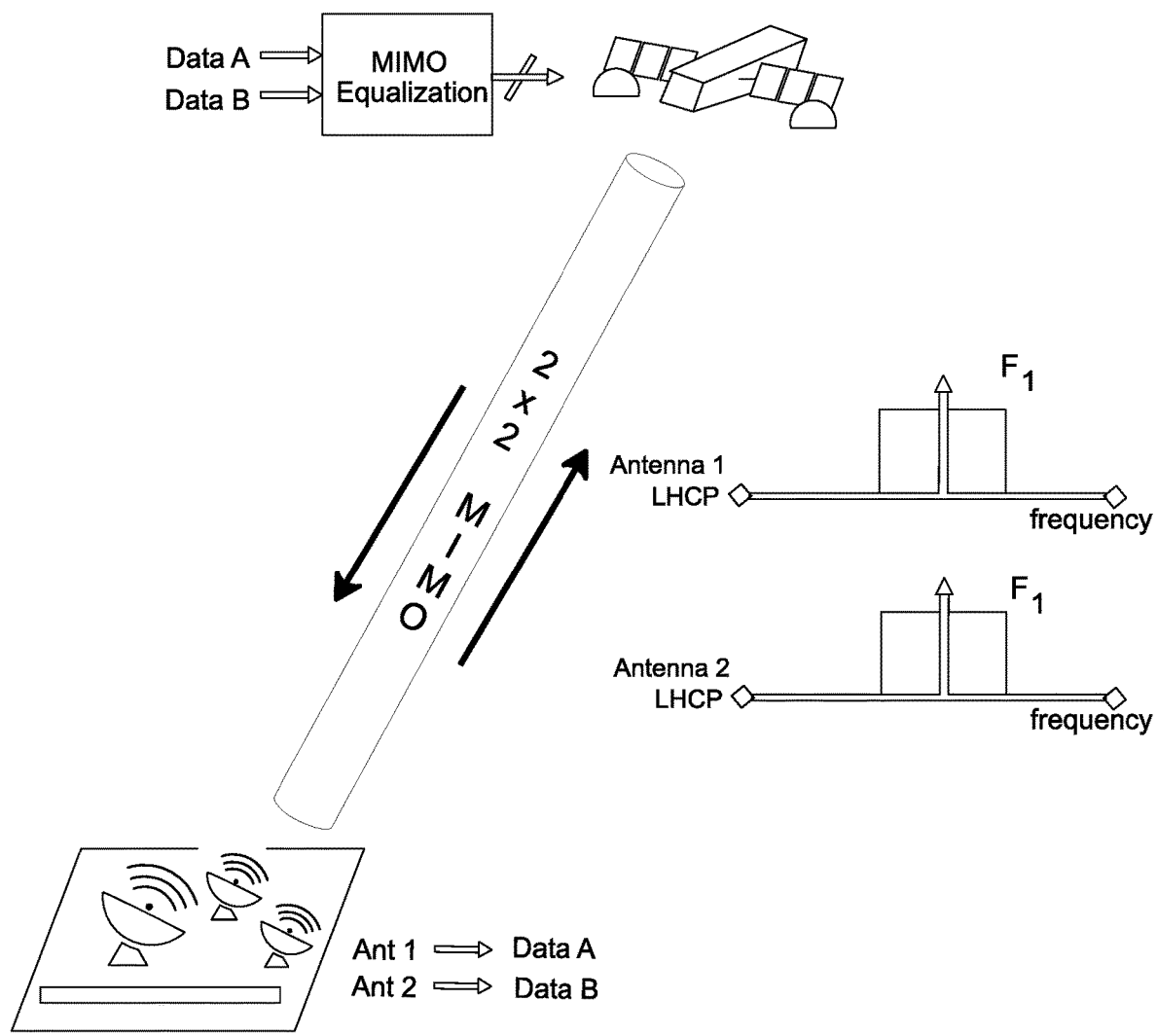

FIGS. 14-17 are diagrams of examples of communication system configurations according to various embodiments. FIG. 14 illustrates an example of Configuration 1 shown in Table 2, FIG. 15 illustrates an example of Configuration 2 shown in Table 2, FIG. 16 illustrates an example of Configuration 3 shown in Table 2, and FIG. 17 illustrates an example of Configuration 4 shown in Table 2, FIG. 14 illustrates the Configuration 1 shown in Table 2. As shown in FIG. 14, the AP 10 includes a payload providing MIMO equalization. The controller 110 on the AP 10 performs MIMO equalization for Antenna 1 (Ant 1) and Antenna 2 (Ant 2) to output Data A and Data B respectively. With 2×2 MIMO, throughput doubles while using the same frequency spectrum f1 and the same total power, as illustrated in the inset. The inset illustrates left hand circular polarized (LHCP) antennas, but embodiments are not limited thereto. For 2×2 MIMO, the service platform 50 (or ground station 30) has a minimum of three antennas. While FIG. 14 illustrates an example using 2×2 MIMO, embodiments are not limited thereto and, in some embodiments, the AP 10 may provide MIMO equalization for 3×3 MIMO or for N×N MIMO.

FIG. 15 illustrates the Configuration 2 shown in Table 2. As shown in FIG. 15, the service platform 50 (or ground station 30) provides MIMO precoding. The controller 210 of the service platform 50 may perform MIMO precoding for Data A and Data B to supply data streams 1 and 2, and control the third antennas 55 to transmit the Data Stream 1 and Data Stream 2 to AP 10. The AP 10 receives Data A on Antenna 1 (Ant 1) and Data 2 on Antenna 2. With 2×2 MIMO, throughput doubles while using the same frequency spectrum f1 and the same total power, as illustrated in the inset. The inset illustrates left hand circular polarized (LHCP) antennas, but embodiments are not limited thereto. For 2×2 MIMO, according to some embodiments, the service platform 50 (or ground station 30) may have a minimum of three antennas. In other embodiments, the service platform 50 (or ground station 30) may have two antennas with controller 210 of the service platform 50 (or ground station 30) providing the MIMO precoding compensating for the movement and orientation changes of the AP 10. Additionally, the controller 210 may control the individual third antennas 55 to be physically or electronically moved relative to each other as described above. While FIG. 15 illustrates an example using 2×2 MIMO, embodiments are not limited thereto and, in some embodiments, the service platform 50 (or ground station 30) may provide MIMO precoding for 3×3 MIMO or for N×N MIMO.

FIG. 16 illustrates the Configuration 3 shown in Table 2. As shown in FIG. 16, the AP 10 may transmit Data A and Data B to the service platform 50 (or ground station 30), and the service platform 50 (or ground station 30) may provide MIMO equalization. The controller 210 of the service platform 50 may perform MIMO equalization for Antenna 1 (Ant 1) and Antenna 2 (Ant 2) to output Data A and Data B respectively. With 2×2 MIMO, throughput doubles while using the same frequency spectrum f1 and the same total power, as illustrated in the inset. The inset illustrates left hand circular polarized (LHCP) antennas, but embodiments are not limited thereto. For 2×2 MIMO, the service platform 50 (or ground station 30) may have a minimum of three antennas. While FIG. 16 illustrates an example using 2×2 MIMO, embodiments are not limited thereto and, in some embodiments, the service platform 50 (or ground station 30) may provide MIMO equalization for 3×3 MIMO or for N×N MIMO.

For example, FIG. 17 illustrates the Configuration 4 shown in Table 2. As shown in FIG. 17, the AP 10 includes a payload providing MIMO precoding. The controller 110 on the AP 10 performs MIMO precoding for Data A and Data B to supply Data Streams 1 and 2, and controls the first antennas 15 to transmit the Data Stream 1 and Data Stream 2 to the service platform 50 (or ground station 30). The service platform 50 (or ground station 30) receives Data A on Antenna 1 (Ant 1) and Data 2 on Antenna 2. With 2×2 MIMO, throughput doubles while using the same frequency spectrum f1 and the same total power, as illustrated in the inset. The inset illustrates left hand circular polarized (LHCP) antennas, but embodiments are not limited thereto. For 2×2 MIMO, according to some embodiments, the service platform 50 (or ground station 30) may have a minimum of three antennas. In other embodiments, the service platform 50 (or ground station 30) may have two antennas with controller 110 of the AP 10 providing the MIMO precoding compensating for the movement and orientation changes of the AP 10. Additionally, the controller 210 may control the individual third antennas 55 to be physically or electronically moved relative to each other as described above. While FIG. 17 illustrates an example using 2×2 MIMO, embodiments are not limited thereto and, in some embodiments, the AP 10 may provide MIMO precoding for 3×3 MIMO or for N×N MIMO.

Figure 18:
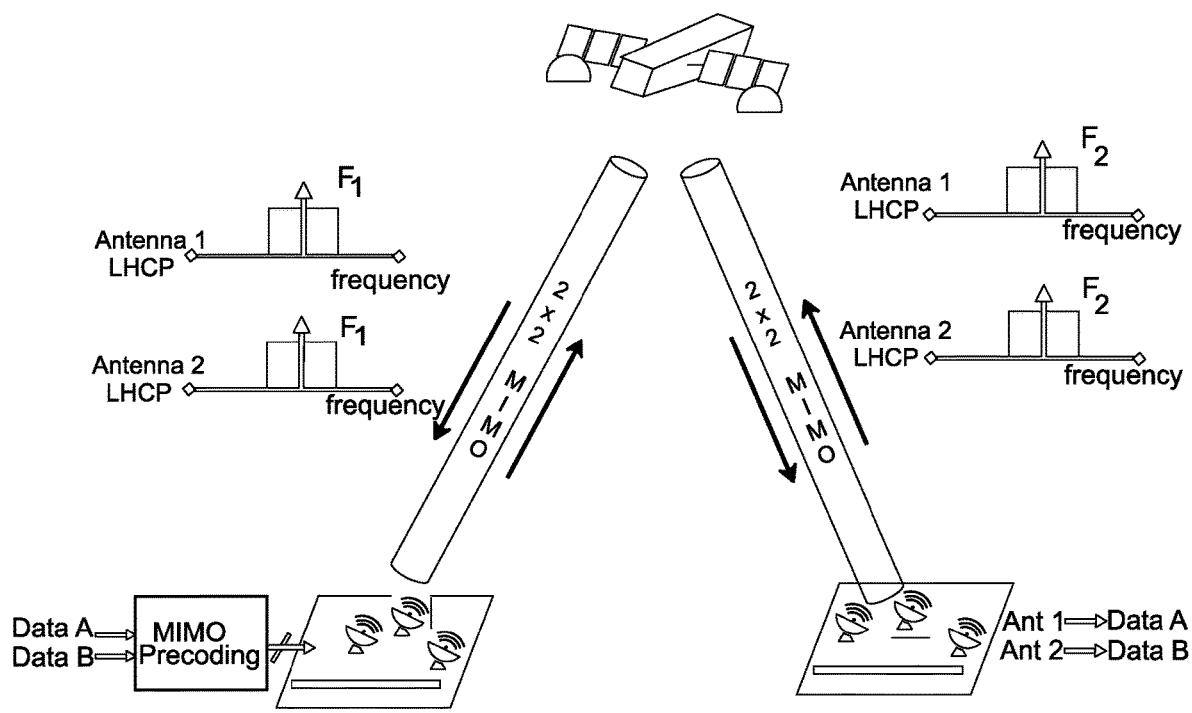
FIGS. 18-19 are diagrams of examples of communication systems incorporating a bent pipe architecture configuration, according to various embodiments.
Figure 19:
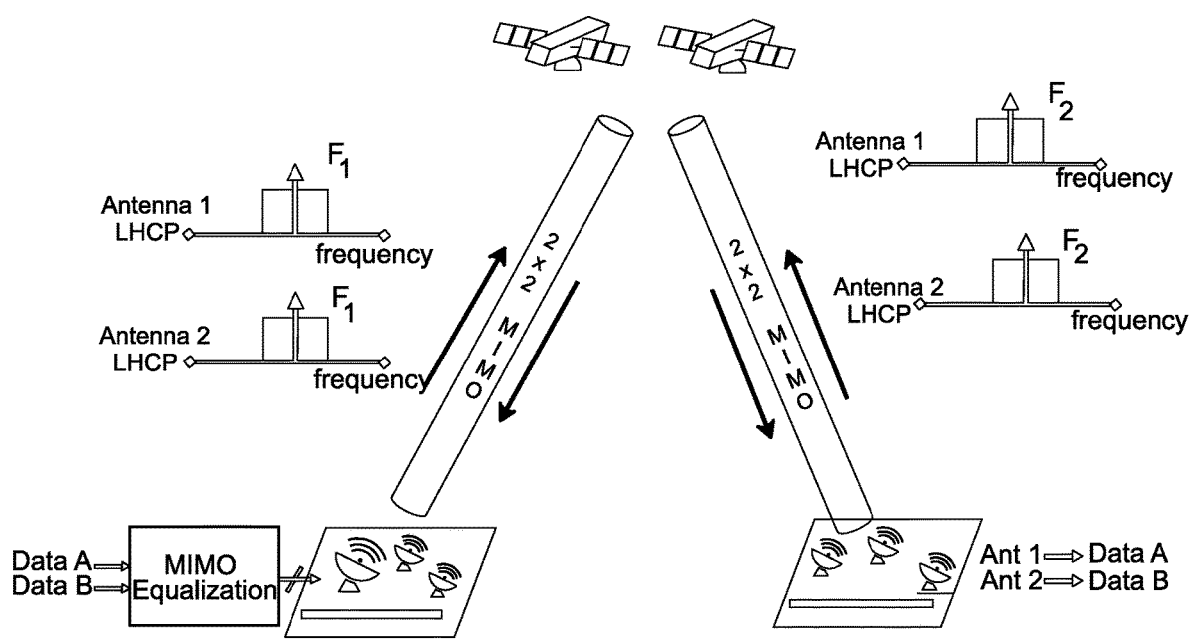

FIGS. 18-19 are diagrams of examples of communication systems incorporating a bent pipe architecture configuration, according to various embodiments.

FIG. 18 illustrates an example of a single AP with bent-pipe payload architecture, according to various embodiments. As shown in FIG. 18, the AP 10 has a bent-pipe architecture with LoS MIMO. In the bent-pipe payload architecture, a same local oscillator (LO) on the AP 10 is used for frequency translation from the uplink frequency to the downlink frequency.

As shown in FIG. 18, the service platform 50 (or ground station 30) provides MIMO precoding. The controller 210 of the service platform 50 may perform MIMO precoding for Data A and Data B to supply Data Streams 1 and 2, and control the third antennas 55 to transmit the Data Stream 1 and Data Stream 2 to AP 10. The AP 10 receives Data A on Antenna 1 (Ant 1) and Data 2 on Antenna 2 and transmits the Data A (Ant 1) and Data 2 on Antenna 2 (Ant2) to the ground station 30. With 2×2 MIMO, throughput doubles while using the same frequency spectrum f1 and the same total power, as illustrated in the inset. The inset illustrates left hand circular polarized (LHCP) antennas, but embodiments are not limited thereto. For 2×2 MIMO, the service platform 50 (or ground station 30) may have two or more antennas. Additionally, the controller 210 may control the individual third antennas 55 to be physically or electronically moved relative to each other as described above, and similarly the controller of the ground station 30 may control the individual antennas at the ground station to be physically or electronically moved relative to each other as described above. While FIG. 18 illustrates an example using 2×2 MIMO, embodiments are not limited thereto and, in some embodiments, the service platform 50 may provide MIMO precoding for 3×3 MIMO or for N×N MIMO.

FIG. 19 illustrates an example of a configuration employing two APs with bent-pipe payload architecture, according to various embodiments. In the example illustrated in FIG. 19, two APs may be provided, with each of the two APs having a single antenna. However, embodiments are not limited thereto, and in some embodiments, three or more APs may be provided in a constellation. The APs may be communicatively coupled via radio frequency (RF) and/or laser signals to provide inter-AP connectivity. In the embodiment illustrated in FIG. 19, the local oscillator (LO) of each AP may not necessarily be synchronized, and thus, a feedback channel may be provided on the return link to feed the MIMO precoding at the service platform 50. Otherwise, the operation is similar to the example illustrated in FIG. 18 and repeated description thereof is omitted for conciseness.

Figure 20:
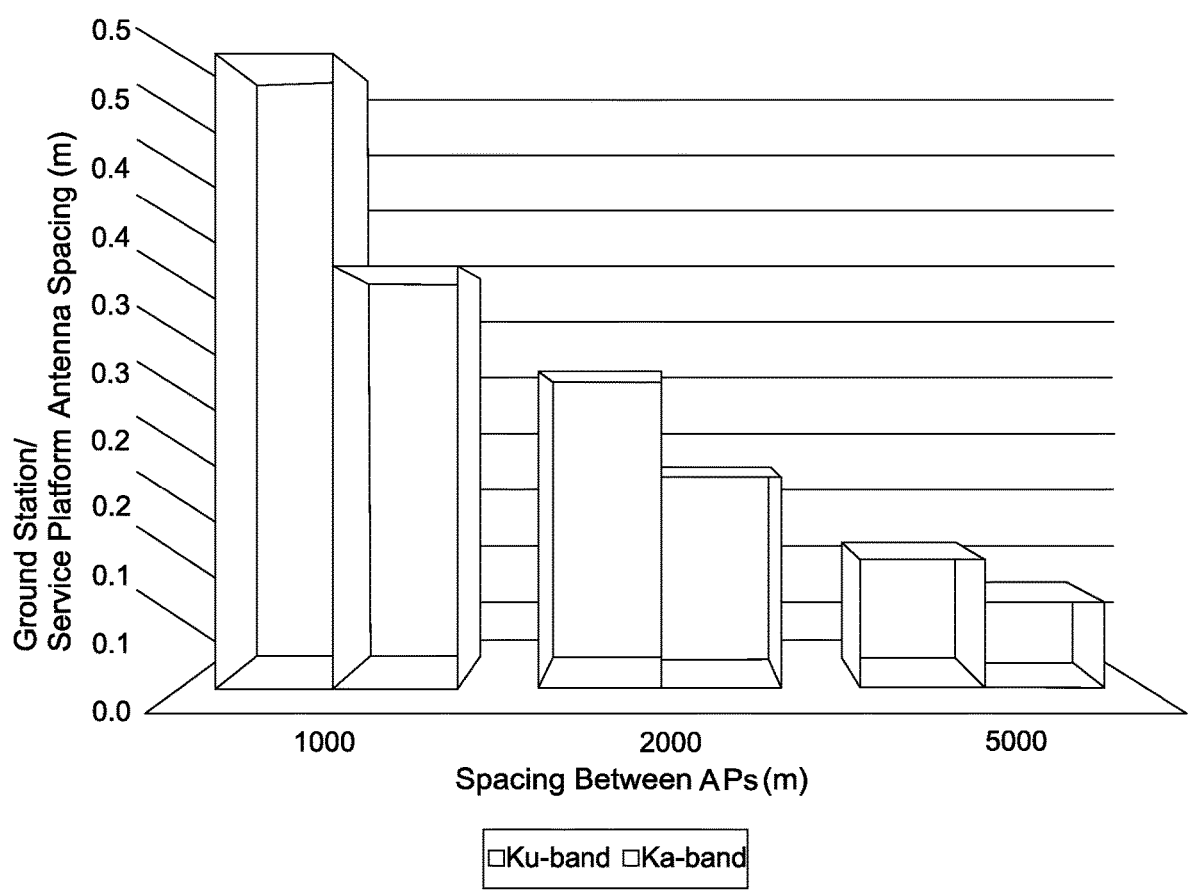
FIG. 20 is a diagram of an example of antenna spacing in a communication system having a configuration with multiple APs, each with a single antenna, according to an embodiment.

FIG. 20 is a diagram of an example of antenna spacing in a communication system having a configuration with multiple APs, each with a single antenna, according to an embodiment. As illustrated in FIG. 20, by providing multiple APs each with a single antenna as in the embodiment illustrated in FIG. 19, the spacing between third antennas 55 on the service platform 50 and/or the spacing between the antennas at the ground station 30 may be shorter, typically on the order of less than a meter. For example, for a spacing between APs of 1000 meters, the spacing between third antennas 55 on the service platform 50 may be 0.5 m at Ku-band, and 0.3 m at Ka-band.

The configuration illustrated in FIG. 19 thus provides an advantage in that very compact antenna configuration at the service platform 50 and/or at the ground station 30 may be achieved. Additionally, existing APs may be used as a group to double the capacity density without having to reconfigure the existing APs.

Figure 21:
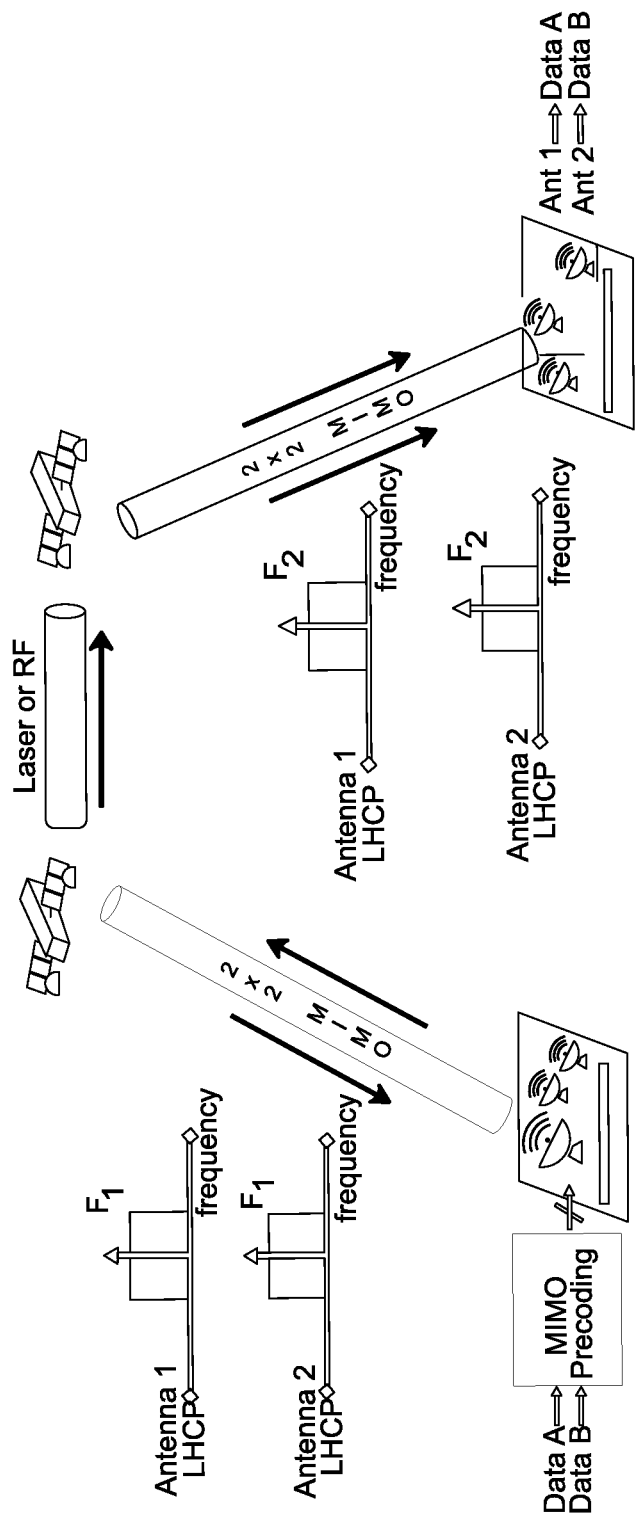
FIG. 21 is a diagram of an example of the communication system having a configuration with multiple APs, each with multiple antennas, according to an embodiment.

FIG. 21 is a diagram of an example of the communication system having a configuration with multiple APs, each with a multiple antennas, according to an embodiment.

FIG. 21 shows an example in which the APs have a bent-pipe payload architecture with MIMO technology including laser/RF inter-AP connectivity. The example illustrated in FIG. 21 is shown with two APs with multiple antennas but embodiments are not limited thereto, and in some embodiments, more than two APs may be provided. The operation is similar to that of the embodiment of FIG. 18 and thus repeated description thereof is omitted for conciseness.

Unlike fixed terrestrial base stations that are attached to steel towers, an advantage of the AP is mobility. The communication system according to various embodiments disclosed herein may provide terrestrial-like connectivity to service platforms, such as cruise ships, connected vehicles, 4G/LTE & 5G base station backhaul, Internet of Things (IoT), fixed broadband terminals, airplanes, rural homes and schools, and direct-to-device services to which such connectivity has heretofore been unavailable. Due to the significantly lower altitude of the AP compared to geosynchronous satellites (e.g., 20 km versus 35,786 km), the user experience is may be the same as terrestrial networks for all applications.

Various embodiments may be implemented as follows.

Implementation 1

According to a first implementation, there is provided a communication system for multiple-in-multiple-out (MIMO) communication with an aerial platform, the communication system comprising a service platform comprising a plurality of first antennas in MIMO communication with a plurality of second antennas on the aerial platform, a number of the first antennas being greater than a number of the second antennas; and a controller communicatively coupled to the plurality of first antennas and configured to select a subset of the first antennas, based on information related to the aerial platform, and to communicate a plurality of data streams with the aerial platform via the subset of the first antennas that is selected.

Implementation 2

In the communication system of implementation 1, the controller may select the subset of the first antennas to maximize a data throughput between the service platform and the aerial platform and/or to minimize a power usage by the aerial platform.

Implementation 3

In the communication system of implementation 1 or 2, at least one of the plurality of first antennas may be not selected in the subset.

Implementation 4

In the communication system of any of the implementations 1-3, the controller may select the subset of the first antennas based on a slant range between the service platform and the aerial platform.

Implementation 5

In the communication system of any of the implementations 1-4, the controller may be further configured to control the first antennas of the subset of the first antennas to physically or electronically move relative to each other in three dimensions to maximize a data throughput between the service platform and the aerial platform and/or to minimize a power usage by the aerial platform.

Implementation 6

In the communication system of any of the implementations 1-5, the controller may be configured to process real-time orientation information of the aerial platform using an artificial intelligence algorithm to control the first antennas of the subset of antennas to move relative to each other to converge to a relative orientation between the first antennas and the second antennas that maximizes the data throughput.

Implementation 7

In the communication system of any of the implementations 1-6, each of the plurality of first antennas may be a flat panel antenna, a parabolic antenna, or a phased array antenna.

Implementation 8

In the communication system of any of the implementations 1-7, the plurality of first antennas may be provided as a single flat panel antenna having a plurality of subareas, and the controller may be configured to the plurality of subareas to be active or inactive to increase or decrease a distance between independent beams formed by the subareas.

Implementation 9

In the communication system of any of the implementations 1-7, wherein each of the plurality of first antennas may be a phased array antenna comprising an array of a plurality of antenna elements, and the controller may be configured to control the phased array antennas to physically move in three dimensions relative to each other, and to individually control elements of the plurality of antenna elements of each phase array antenna to be active or inactive to increase or decrease a distance between independent beams formed by the plurality of antenna elements.

Implementation 10

In the communication system of any of the implementations 1-9, the controller may select the subset of first antennas based on a first orientation of the aerial platform in a first period, and may select a different subset of the first antennas based on a second orientation of the aerial platform in a second period that is different from the first period.

Implementation 11

In the communication system of any of the implementations 1-10, the controller may select all of the plurality of first antennas during a third period that is different from the first period and different from the second period.

Implementation 12

In the communication system of any of the implementations 1-11, the controller may be configured to receive the orientation of the aerial platform and a location of the aerial platform via a control signal from a ground station and/or via an in-band signal from the aerial platform.

Implementation 13

In the communication system of any of the implementations 1-12, wherein the service platform may be a gateway station communicatively coupled to a terrestrial communication network.

Implementation 14

In the communication system of any of the implementations 1-12, the service platform may be a service platform.

Implementation 15

In the communication system of any of the implementations 1-14, wherein the service platform may be a cruise ship, a connected car, a connected truck, a cargo ship, a school building, an airplane, or a home.

Implementation 16

In the communication system of any of the implementations 1-15, the MIMO communication may be 2×2 MIMO, 3×3 MIMO, 4×4 MIMO, or more.

Implementation 17

According to a seventeenth implementation, there is provided a communication system comprising an aerial platform having a plurality of first antennas; a ground station having a plurality of second antennas in line-of-sight (LoS) multiple-in-multiple-out (MIMO) communication with the plurality of first antennas on the aerial platform; a service platform comprising a plurality of third antennas in LoS MIMO communication with the plurality of first antennas on the aerial platform, a number of the third antennas being greater than a number of the first antennas and a number of the second antennas being greater than the number of the first antennas; a first controller communicatively coupled to the plurality of second antennas and configured to select a subset of the second antennas, based on at least an orientation of the aerial platform relative to the ground station, for a feeder link with the aerial platform, and to communicate a plurality of data streams with the aerial platform via the subset of the second antennas that is selected; and a second controller communicatively coupled to the plurality of third antennas and configured to select a subset of the third antennas, based on at least an orientation of the aerial platform relative to the service platform, for a service link with the aerial platform, and to communicate the plurality of data streams with the aerial platform via the subset of the third antennas that is selected.

Implementation 18

In the communication system of implementation 17, the aerial platform may have a bent-pipe payload architecture, and the first and second controllers may control such that a forward link is MIMO and a return link is single-inputsingle-output (SISO), or the forward link is SISO and the return link is MIMO, or the forward link is MIMO and the return link is MIMO.

Implementation 19

In the communication system of implementation 17, the aerial platform may have a regenerative payload architecture, and the first and second controllers control such that at least one of the uplink and the downlink of the feeder link is MIMO, and the service link is 4G/5G radio, or at least one of the uplink and the downlink of the feeder link is MIMO, and at least one of the uplink and the downlink of the service link is MIMO.

Implementation 20

According to a twentieth implementation, there is provided a communication system comprising two or more aerial platforms, each having a first antenna; a ground station having a plurality of second antennas in line-of-sight (LoS) multiple-in-multiple-out (MIMO) communication with the first antennas; a service platform comprising a plurality of third antennas in LoS MIMO communication with the first antennas on the aerial platform, a number of the third antennas being greater than a number of the first antennas and a number of the second antennas being greater than the number of the first antennas; a first controller communicatively coupled to the plurality of second antennas and configured to select a subset of the second antennas, based on at least orientations of the two or more aerial platforms relative to the ground station, for a feeder link with the two or more aerial platforms, and to communicate a plurality of data streams with the two or more aerial platforms via the subset of the second antennas that is selected; and a second controller communicatively coupled to the plurality of third antennas and configured to select a subset of the third antennas, based on at least orientations of the two or more aerial platforms relative to the service platform, for a service link with the two or more aerial platforms, and to communicate the plurality of data streams with the two or more aerial platforms via the subset of the third antennas that is selected.

Implementation 21

In the communication system of implementation 20, wherein the first controller may perform MIMO precoding or MIMO equalization for the ground station and the second controller may perform MIMO precoding or MIMO equalization for the service platform.

Implementation 22

In the communication system of implementations 20 or 21, the two or more aerial platforms may be communicatively connected by laser or RF connection.

Implementation 23

In the communication system of any of the implementations 20-22, each of the two or more aerial platforms may have a bent-pipe payload architecture, and the first and second controllers may control such that a forward link is MIMO and a return link is single-in-single-out (SISO), or the forward link is SISO and the return link is MIMO, or the forward link is MIMO and the return link is MIMO.

Implementation 24

In the communication system of any of the implementations 20-23, the first controller may perform MIMO precoding or MIMO equalization for the ground station and the second controller may perform MIMO precoding or MIMO equalization for the service platform.

Implementation 25

In the communication system of any of the implementations 20-24, the two or more aerial platforms may be communicatively connected by laser or RF connection.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

Although various embodiments have been discussed with reference to accompanying drawings, it will be understood that various changes in form and details may be made to the various embodiments without departing from the spirit and scope of the appended claims.

What is claimed is:

1. A communication system for multiple-in-multiple-out (MIMO) communication with an aerial platform, the communication system comprising:
 a service platform comprising a plurality of first antennas in line-of-sight (LoS) MIMO communication with a plurality of second antennas on the aerial platform, a number of the first antennas being greater than a number of the second antennas; and
 a controller communicatively coupled to the plurality of first antennas and configured to select a subset of the first antennas and to communicate a plurality of data streams with the aerial platform via the subset of the first antennas that is selected,
 wherein the controller selects the subset of the first antennas such that the first antennas of the subset have spacings therebetween based on at least two of information related to an aerial platform orientation relative to the first antennas, information related to a spacing of the second antennas, information related to a slant range, and information related to a frequency of operation.

2. The communication system of claim 1, wherein at least one of the plurality of first antennas is not selected in the subset.

3. The communication system of claim 1, wherein the slant range is between the service platform and the aerial platform.

4. The communication system of claim 1, wherein the controller is further configured to control the first antennas of the subset of the first antennas to physically or electronically move relative to each other in at least one of three dimensions to maximize a data throughput between the service platform and the aerial platform and/or to minimize a power usage by the aerial platform.

5. The communication system of claim 4, wherein the controller is configured to process real-time orientation information of the aerial platform using an artificial intelligence algorithm to control the first antennas of the subset of antennas to move relative to each other to converge to a relative orientation between the first antennas and the second antennas that maximizes the data throughput.

6. The communication system of claim 4, wherein each of the plurality of first antennas is a flat panel antenna, a parabolic antenna, or a phased array antenna.

7. The communication system of claim 4, wherein the plurality of first antennas are included in a single flat panel antenna, and
the controller is configured to control the plurality of first antennas to be active or inactive to increase or decrease a distance between independent beams formed by the plurality of first antennas.

8. The communication system of claim 4, wherein each of the plurality of first antennas is a phased array antenna comprising an array of a plurality of antenna elements, and
the controller is configured to control the phased array antennas to physically move in at least one of three dimensions relative to each other, and to individually control antenna elements of the plurality of antenna elements of each phase array antenna to be active or inactive to increase or decrease a distance between independent beams formed by the plurality of antenna elements.

9. The communication system of claim 1, wherein the information related to the aerial platform orientation comprises a first orientation of the aerial platform in a first period and a second orientation of the aerial platform in a second period that is different than the first period, and the controller selects the subset of first antennas based on the first orientation of the aerial platform in the first period, and selects a different subset of the first antennas based on the second orientation of the aerial platform in the second period.

10. The communication system of claim 9, wherein the controller selects all of the plurality of first antennas during a third period that is different from the first period and different from the second period.

11. The communication system of claim 1, wherein the controller is configured to receive the information related to the aerial platform orientation via a control signal from a ground station and/or via an in-band signal from the aerial platform.

12. The communication system of claim 1, further comprising a ground station communicatively coupled to a terrestrial communication network and to the aerial platform.

13. The communication system of claim 1, wherein the service platform is a cruise ship, a connected car, a connected truck, a cargo ship, a school building, an airplane, or a home.

14. The communication system of claim 1, wherein the MIMO communication is 2×2 MIMO, 3×3 MIMO, 4×4 MIMO, or more.

15. A communication system comprising:
an aerial platform having a plurality of first antennas;
a ground station having a plurality of second antennas in line-of-sight (LoS) multiple-in-multiple-out (MIMO) communication with the plurality of first antennas on the aerial platform;
a service platform comprising a plurality of third antennas in LoS MIMO communication with the plurality of first antennas on the aerial platform, a number of the third antennas being greater than a number of the first antennas and a number of the second antennas being greater than the number of the first antennas;
a first controller communicatively coupled to the plurality of second antennas and configured to select a subset of the second antennas for a feeder link with the aerial platform, and to communicate a plurality of data streams with the aerial platform via the subset of the second antennas that is selected; and
a second controller communicatively coupled to the plurality of third antennas and configured to select a subset of the third antennas for a service link with the aerial platform, and to communicate the plurality of data streams with the aerial platform via the subset of the third antennas that is selected,
wherein the first controller selects the subset of the second antennas such that the second antennas of the subset have spacings therebetween based on at least two of information related to an aerial platform orientation relative to the second antennas, information related to a spacing of the first antennas, information related to a slant range, and information related to a first frequency of operation, and
wherein the second controller selects the subset of the third antennas such that the third antennas of the subset have spacings therebetween based on at least two of information related to an aerial platform orientation relative to the third antennas, information related to a spacing of the first antennas, information related to a slant range, and information related to a second frequency of operation.

16. The communication system of claim 15, wherein the aerial platform has a bent-pipe payload architecture, and the first and second controllers control such that:
a forward link is MIMO and a return link is single-input-single-output (SISO), or
the forward link is SISO and the return link is MIMO, or
the forward link is MIMO and the return link is MIMO.

17. The communication system of claim 15, wherein the aerial platform has a regenerative payload architecture, and the first and second controllers control such that:
at least one of the uplink and the downlink of the feeder link is MIMO, and the service link is 4G/5G radio, or
at least one of the uplink and the downlink of the feeder link is MIMO, and at least one of the uplink and the downlink of the service link is MIMO.

18. A communication system comprising:
two or more aerial platforms communicatively connected by laser or RF connection, each of the two or more aerial platforms having a first antenna;

a ground station having a plurality of second antennas in line-of-sight (LoS) multiple-in-multiple-out (MIMO) communication with the first antennas;

a service platform comprising a plurality of third antennas in LoS MIMO communication with the first antennas on the two or more aerial platforms, a number of the third antennas being greater than a number of the first antennas and a number of the second antennas being greater than the number of the first antennas;

a first controller communicatively coupled to the plurality of second antennas and configured to select a subset of the second antennas for a feeder link with the two or more aerial platforms, and to communicate a plurality of data streams with the two or more aerial platforms via the subset of the second antennas that is selected; and a second controller communicatively coupled to the plurality of third antennas and configured to select a subset of the third antennas for a service link with the two or more aerial platforms, and to communicate the plurality of data streams with the two or more aerial platforms via the subset of the third antennas that is selected, wherein the first controller selects the subset of the second antennas such that the second antennas of the subset have spacings therebetween based on at least two of information related to an aerial platform orientation relative to the second antennas, information related to a spacing of the first antennas, information related to a slant range, and information related to a first frequency of operation, and wherein the second controller selects the subset of the third antennas such that the third antennas of the subset have spacings therebetween based on at least two of information related to an aerial platform orientation relative to the third antennas, information related to a spacing of the first antennas, information related to a slant range, and information related to a second frequency of operation.

19. The communication system of claim 18, wherein the first controller performs MIMO precoding or MIMO equalization for the ground station and the second controller performs MIMO precoding or MIMO equalization for the service platform.

20. The communication system of claim 18, wherein each of the two or more aerial platforms has a bent-pipe payload architecture, and the first and second controllers control such that:

a forward link is MIMO and a return link is single-in-single-out (SISO), or the forward link is SISO and the return link is MIMO, or the forward link is MIMO and the return link is MIMO.

* * * * *